(12) United States Patent
Lee et al.

(10) Patent No.: US 9,276,772 B2
(45) Date of Patent: Mar. 1, 2016

(54) METHOD AND APPARATUS FOR TRANSMITTING AND RECEIVING DATA BASED ON SECURED PATH BANDWIDTH IN NETWORK ESTABLISHED BY USING AUDIO/VIDEO INTERFACE

(75) Inventors: Jae-min Lee, Suwon-si (KR); Il-ju Na, Yongin-si (KR); Seung-hwan Kim, Seoul (KR); Seung-kwon Park, Yongin-si (KR); Bong-hwan Cho, Suwon-si (KR); Harkirat Singh, Santa Clara, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 13/213,914

(22) Filed: Aug. 19, 2011

(65) Prior Publication Data
US 2012/0047281 A1    Feb. 23, 2012

Related U.S. Application Data

(60) Provisional application No. 61/375,379, filed on Aug. 20, 2010.

(30) Foreign Application Priority Data

Jul. 20, 2011 (KR) .................. 10-2011-0072080

(51) Int. Cl.
*G06F 15/16* (2006.01)
*H04L 12/64* (2006.01)

(52) U.S. Cl.
CPC .............................. *H04L 12/6418* (2013.01)

(58) Field of Classification Search
CPC . H04L 2209/60; H04L 12/6418; H04L 65/80; H04L 67/2823; G06F 21/10; G06F 15/16
USPC .......................................... 709/223, 231, 238
See application file for complete search history.

(56) References Cited

U.S. PATENT DOCUMENTS

| | | | |
|---|---|---|---|
| 6,321,260 B1 | 11/2001 | Takeuchi et al. | |
| 6,910,024 B2 | 6/2005 | Krishnamurthy et al. | |
| 7,206,320 B2 | 4/2007 | Iwamura | |
| 7,380,118 B2 * | 5/2008 | Kuwano et al. | ............... 713/155 |
| 7,466,705 B2 | 12/2008 | Saito et al. | |
| 8,009,590 B2 | 8/2011 | Straub et al. | |

(Continued)

FOREIGN PATENT DOCUMENTS

| | | |
|---|---|---|
| CN | 1882888 A | 12/2006 |
| CN | 101375558 A | 2/2009 |

(Continued)

OTHER PUBLICATIONS

English machine translation from KIPO for KR 1020080021455 A.*

(Continued)

*Primary Examiner* — Benjamin M Thieu
(74) *Attorney, Agent, or Firm* — Sughrue Mion, PLLC

(57) ABSTRACT

A method and apparatus for transmitting and receiving data. The method and apparatus previously determines a validity of a data transmission path for transmitting a stream from a source device to a sink device. The validity of the transmission path is verified by checking and securing the data transmission path, thereby executing a streaming service based on the validity.

10 Claims, 21 Drawing Sheets

(56) References Cited

U.S. PATENT DOCUMENTS

| | | | |
|---|---|---|---|
| 8,023,585 B2* | 9/2011 | Majima | 375/295 |
| 8,364,822 B2* | 1/2013 | Takeda et al. | 709/227 |
| 8,446,909 B2 | 5/2013 | Feng et al. | |
| 8,516,096 B2* | 8/2013 | LeBlanc et al. | 709/223 |
| 2002/0099955 A1* | 7/2002 | Peled et al. | 713/200 |
| 2003/0133454 A1* | 7/2003 | Gallant et al. | 370/395.1 |
| 2003/0208607 A1* | 11/2003 | Yamazaki | 709/229 |
| 2004/0122970 A1* | 6/2004 | Kawaguchi et al. | 709/235 |
| 2004/0162113 A1* | 8/2004 | Oomoto et al. | 455/560 |
| 2004/0215799 A1* | 10/2004 | Lehmann et al. | 709/230 |
| 2004/0261101 A1 | 12/2004 | Iwamura | |
| 2005/0168693 A1* | 8/2005 | Mizer et al. | 352/40 |
| 2005/0174229 A1* | 8/2005 | Feldkamp et al. | 340/506 |
| 2006/0136233 A1* | 6/2006 | Takeda et al. | 705/1 |
| 2006/0222322 A1* | 10/2006 | Levitan | 386/68 |
| 2008/0091811 A1* | 4/2008 | Wing et al. | 709/223 |
| 2008/0189351 A1* | 8/2008 | Nemoto et al. | 709/201 |
| 2009/0024727 A1 | 1/2009 | Jeon et al. | |
| 2009/0028186 A1* | 1/2009 | Schmidt et al. | 370/468 |
| 2009/0083429 A1* | 3/2009 | Krig | 709/228 |
| 2009/0241147 A1 | 9/2009 | Kim et al. | |
| 2010/0008291 A1 | 1/2010 | LeBlanc et al. | |
| 2010/0058422 A1* | 3/2010 | Ochiai et al. | 725/116 |
| 2011/0004757 A1* | 1/2011 | Horn et al. | 713/168 |
| 2011/0296508 A1* | 12/2011 | Os et al. | 726/7 |
| 2012/0144000 A1* | 6/2012 | Nogami et al. | 709/219 |

FOREIGN PATENT DOCUMENTS

| | | | |
|---|---|---|---|
| CN | 101627633 A | 1/2010 | |
| JP | 10308759 A | 11/1998 | |
| JP | 1185632 A | 3/1999 | |
| JP | 2995676 B2 | 12/1999 | |
| JP | 2004508739 A | 3/2004 | |
| JP | 2004512737 A | 4/2004 | |
| JP | 200695787 A | 4/2006 | |
| JP | 2008125042 A | 5/2008 | |
| JP | 2010518653 A | 5/2010 | |
| KR | 1020080021455 A | 3/2008 | |
| KR | 1020080021456 A | 3/2008 | |
| KR | 1020080102359 A | 11/2008 | |

OTHER PUBLICATIONS

Communication dated Mar. 2, 2012 issued by the International Searching Authority in counterpart International Application No. PCT/KR2011/006124.

Communication from the European Patent Office issued Mar. 28, 2014 in a counterpart European Application No. 11818429.0.

Communication, Issued by the State Intellectual Property Office of P.R. China, Dated Dec. 17, 2014, in counterpart Chinese Application No. 201180040408.6.

Communication issued on Mar. 24, 2015 by the Japanese Patent Office in related Application No. 2013-524800.

Manner et al. "NSLP for Quality-of-Service Signalling", draft-ietf-nsis-qos-nsip-11.txt, Jun. 2006, total 78 pages, retrieved from <https://tools.ietf.org/html/draft-ietf-nsis-qos-nsip-11>.

Communication issued Aug. 18, 2015, issued by the State Intellectual Property Office of the People's Republic of China in counterpart Chinese Patent Application No. 201180040408.6.

* cited by examiner

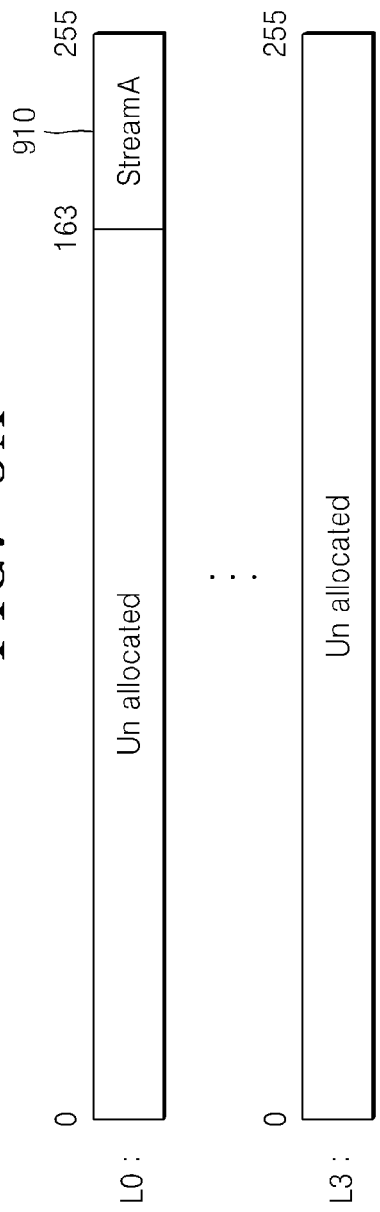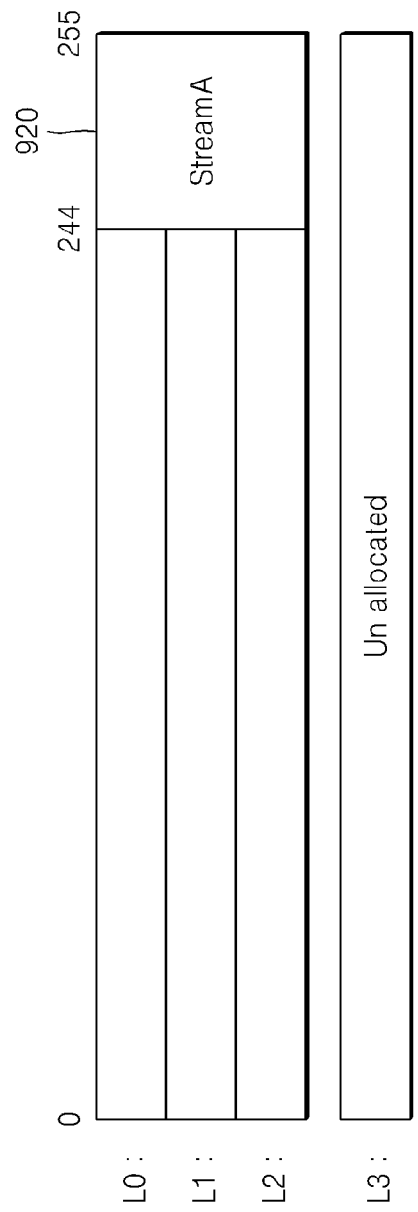

FIG. 11A

| Stream | | In Port | Out Port | BW (Mbps) |
|---|---|---|---|---|
| Source Address | Stream Index | | | |
| RDA_STB | 0x01 | 0 | 0 | 1782 |
| RDA_STB | 0x02 | 0 | 0 | 3564 |
| RDA_GC | 0x01 | 1 | 1 | 3564 |

FIG. 11B

| Stream | | In Port | Out Port | BW (Mbps) |
|---|---|---|---|---|
| Source Address | Stream Index | | | |
| RDA_STB | 0x01 | 2 | 1 | 1782 |
| RDA_TV1 | 0x01 | 1 | 0 | 49 |
| RDA_BDP | 0x01 | 3 | 1 | 7128 |
| RDA_STB | 0x02 | 2 | 1 | 3564 |
| RDA_GC | 0x01 | 1 | 2 | 3564 |

FIG. 11C

| Stream | | In Port | Out Port | BW (Mbps) |
|---|---|---|---|---|
| Source Address | Stream Index | | | |
| RDA_STB | 0x01 | 2 | 1 | 1782 |
| RDA_TV1 | 0x01 | 1 | 2 | 49 |
| RDA_BDP | 0x01 | 2 | 1 | 7128 |
| RDA_STB | 0x02 | 2 | 1 | 3564 |
| RDA_GC | 0x01 | 1 | 2 | 3564 |

FIG. 11D

| Stream | | In Port | Out Port | BW (Mbps) |
| --- | --- | --- | --- | --- |
| Source Address | Stream Index | | | |
| RDA_STB | 0x01 | 2 | 0 | 1782 |
| RDA_TV1 | 0x01 | 0 | 2 | 49 |
| RDA_BDP | 0x01 | 2 | 1 | 7128 |
| RDA_STB | 0x02 | 2 | 1 | 3564 |
| RDA_GC | 0x01 | 1 | 2 | 3564 |

FIG. 11E

| Stream | | In Port | Out Port | BW (Mbps) |
| --- | --- | --- | --- | --- |
| Source Address | Stream Index | | | |
| RDA_BDP | 0x01 | 1 | 0 | 7128 |
| RDA_STB | 0x02 | 1 | 2 | 3564 |
| RDA_GC | 0x01 | 2 | 1 | 3564 |

FIG. 11F

| Stream | | In Port | Out Port | BW (Mbps) |
| --- | --- | --- | --- | --- |
| Source Address | Stream Index | | | |
| RDA_STB | 0x02 | 1 | 2 | 3564 |
| RDA_GC | 0x01 | 0 | 1 | 3564 |

FIG. 11G

| Stream | | In Port | Out Port | BW (Mbps) |
|---|---|---|---|---|
| Source Address | Stream Index | | | |
| RDA_STB | 0x02 | 1 | 0 | 3564 |

FIG. 11H

| Stream | | In Port | Out Port | BW (Mbps) |
|---|---|---|---|---|
| Source Address | Stream Index | | | |
| RDA_GC | 0x01 | 1 | 0 | 3564 |

FIG. 11I

| Stream | | In Port | Out Port | BW (Mbps) |
|---|---|---|---|---|
| Source Address | Stream Index | | | |
| RDA_BDP | 0x01 | 0 | 1 | 7128 |

METHOD AND APPARATUS FOR TRANSMITTING AND RECEIVING DATA BASED ON SECURED PATH BANDWIDTH IN NETWORK ESTABLISHED BY USING AUDIO/VIDEO INTERFACE

CROSS-REFERENCE TO RELATED PATENT APPLICATION

This application claims the benefit of U.S. Provisional Patent Application No. 61/375,379, filed on Aug. 20, 2010, in the U.S. Patent and Trademark Office, and the benefit of Korean Patent Application No. 10-2011-0072080, filed on Jul. 20, 2011, in the Korean Intellectual Property Office, the disclosures of which are incorporated herein in their entirety by reference.

BACKGROUND

1. Field

Apparatuses and methods consistent with exemplary embodiments relate to transmitting and receiving data in a network established by using an audio/video (AV) interface, and more particularly, to transmitting and receiving data based on a secured path bandwidth in a network established by using an AV interface.

2. Description of the Related Art

A source device for providing audio/video (AV) data and a sink device for receiving and reproducing the AV data from the source device are connected to each other based on a predetermined AV interface.

For example, the source device and the sink device may be connected based on an AV interface such as a digital visual interface (DVI) or a high-definition multimedia interface (HDMI) for transmitting digital AV data.

SUMMARY

An aspect may be achieved by providing a method and an apparatus for transmitting and receiving data based on a secured path bandwidth in a network established by using an audio/video (AV) interface.

Another aspect may be achieved by providing a computer readable recording medium having recorded thereon a computer program for executing the method.

According to another aspect, there is provided a method of transmitting data from a first device to a second device which are connected using an audio/video (AV) interface, the method including transmitting to the second device a first request message to secure a path for transmitting a predetermined stream to the second device; receiving by the first device, in response to the first message, from the second device a second message including result information indicating whether the path is secured; and if the path is secured, transmitting, in response to the second message, the predetermined stream to the second device.

The transmitting of the first message to the second device may include transmitting to the second device a third message which is a request to check whether the path is capable of transmitting the predetermined stream; receiving from the second device, in response to the third message, a fourth message including information about attributes of links between devices forming the path; and transmitting the first message to the second device if it is determined based on the fourth message that the path is capable of transmitting the predetermined stream.

The fourth message may include information regarding available bandwidths of the links between the devices forming the path.

The information regarding the available bandwidths of the links may be added to the third message by the devices forming the path and which relay the third message, and the third message with the added information may be transmitted to the second device.

The first message may include information regarding bandwidth required to transmit the predetermined stream.

According to another aspect, there is provided a method of receiving data by a second device from a first device, which are connected based on an audio/video (AV) interface, the method including receiving from the first device a first request message to secure a path for transmitting a predetermined stream to the second device; transmitting, in response to the first message, to the first device a second response message including result information indicating whether the path is secured; and receiving, if the path is secured, in response to the second message, the predetermined stream from the first device.

According to another aspect, there is provided an apparatus for transmitting data from a first device to a second device, which are connected using an audio/video (AV) interface, the apparatus including a path manager which transmits to the second device a first request message to secure a path for transmitting a predetermined stream to the second device, and which receives, in response to the first message, from the second device a second response message including result information indicating whether the path is secured; and a data transmitter which, if the path is secured, in response to the second message, transmits the predetermined stream to the second device.

According to another aspect, there is provided an apparatus for receiving data by a second device from a first device connected using an audio/video (AV) interface, the apparatus including a path manager which receives from the first device a first request message to secure a path for transmitting a predetermined stream to the second device, and which, in response to the first message, transmits to the first device a second response message including result information indicating whether the path is secured, and a data receiver which, if the path is secured, in response to the second message, receives the predetermined stream from the first device.

According to another aspect, there is provided a non-transitory computer readable recording medium having recorded thereon a computer program for executing the method.

BRIEF DESCRIPTION OF THE DRAWINGS

The above aspects and/or other features will become more apparent by describing in detail exemplary embodiments thereof with reference to the attached drawings in which:

FIGS. 9A and 9B are diagrams showing a method of allocating transmission units to a stream, according to an exemplary embodiment;

FIGS. 11A through 11I are forwarding tables for relaying streams, according to an exemplary embodiment;

DETAILED DESCRIPTION OF EXEMPLARY EMBODIMENTS

Figure 1:
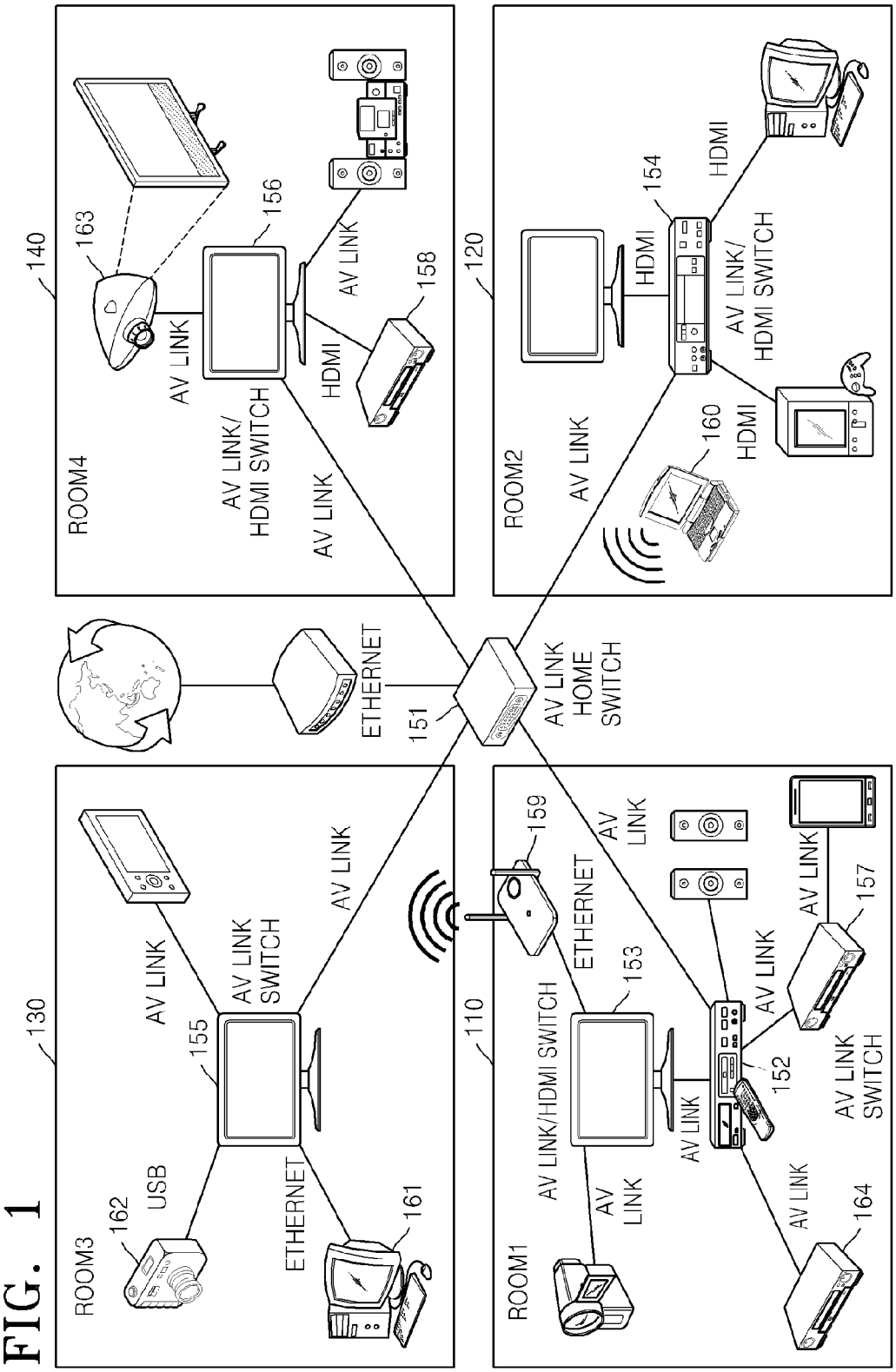
FIG. 1 is a diagram showing a network topology of devices connected based on an audio/video (AV) interface, according to an exemplary embodiment.

Hereinafter, exemplary embodiments will be described with reference to the attached drawings. The exemplary embodiments may be embodied in various forms without being limited to the exemplary embodiments set forth herein. Descriptions of well-known parts are omitted for clarity, and like reference numerals refer to analogous elements throughout. Exemplary embodiments will be described regarding elements that directly relate to an inventive concept, and descriptions of other elements will be omitted. However, it does not mean that the elements whose descriptions are omitted are unnecessary for embodying a method and an apparatus described below.

FIG. 1 is a diagram showing a network topology of devices connected based on an audio and/or video (AV) interface, according to an exemplary embodiment. The AV interface refers to an interface for transmitting and receiving AV data. An 'AV link' refers to a link established based on an AV interface according to an exemplary embodiment, and a high-definition multimedia interface (HDMI) refers to a connection based on an HDMI cable.

Referring to FIG. 1, AV devices may form a network based on an AV interface. AV devices in a plurality of rooms may be connected to various other AV devices in the same or different rooms based on an AV interface. In this case, a switch device for relaying an AV link relays connection based on an AV interface. The switch device may be an additional device for relaying an AV link, e.g., an AV link home switch 151, or may be an AV device (152, 153, 154, 155, 156, or 157) having a switch function. AV devices such as an AV receiver (AVR) 152, a television (TV) 153, and a Bluray disc player (BDP) 157 function as switch devices in a room1 110, and AV devices such as TVs 155 and 156 function as switch devices in a room3 130 and a room4 140.

Also, a switch device may be a device for switching an AV interface according to an exemplary embodiment and an HDMI. For example, a switch device 154 in a room2 120 may receive AV data from a computer and a game console (GC) based on an HDMI, and may transmit the received AV data to a device in the room1 110, the room3 130, or the room4 140 via an AV link according to an exemplary embodiment.

The devices illustrated in FIG. 1 may be classified according to their functions to source/leaf devices, source/switch devices, switch devices, sink/switch devices, and sink/leaf devices.

A device for providing AV data without relaying an AV link, e.g., a set-top box (STB) 164 of the room1 110, corresponds to a source/leaf device, and a device for providing AV data to another device and relaying an AV link, e.g., the BDP 157 of the room1 110, corresponds to a source/switch device. Also, a device for only relaying AV links, e.g., the AV link home switch 151, corresponds to a switch device, and a device for receiving AV data from another device and relaying an AV link, e.g., the TV 156 of the room4 140, corresponds to a sink/switch device. Lastly, a device for receiving AV data from another device without relaying an AV link, e.g., the projector 163 of the room4 140, corresponds to a sink/leaf device.

According to the network topology illustrated in FIG. 1, AV data of the BDP 157 of the room1 110 may be transmitted via the AVR 152 and the AV link home switch 151 to the TV 155 of the room3 130 or the TV 156 of the room4 140. Also, a broadcasting signal received by a STB 158 of the room4 140 may be transmitted via the AV link home switch 151 to the TV 155 of the room3 130, or via the AV link home switch 151 and the AVR 152 to the TV 153 of the room1 110.

In other words, as illustrated in FIG. 1, in order to freely transmit and receive AV data in a network based on an AV interface (hereinafter referred to as an 'AV network'), an AV interface according to an exemplary embodiment has to support bidirectional transmission of data.

AV interfaces according to the related art, e.g., a digital visual interface (DVI) and an HDMI, support only unidirectional data transmission from a source device to a sink device. AV data of a source device may be only transmitted to a sink device, and the sink device may not transmit AV data to the source device based on an AV interface according to the related art, e.g., a DVI or an HDMI. For example, the TV 156 of the room4 140 as a sink device may only receive AV data from the STB 158 connected based on an HDMI, and may not transmit AV data to the STB 158.

However, an AV link based on an AV interface according to an exemplary embodiment supports bidirectional transmission of data and may transmit and receive data to and from a device of another room in the network topology illustrated in FIG. 1. In particular, an AV link according to an exemplary embodiment allows bidirectional transmission of uncompressed video data, and an example of bidirectional transmission of data will be described in detail with reference to FIGS. 2A and 2B.

Figure 2A:
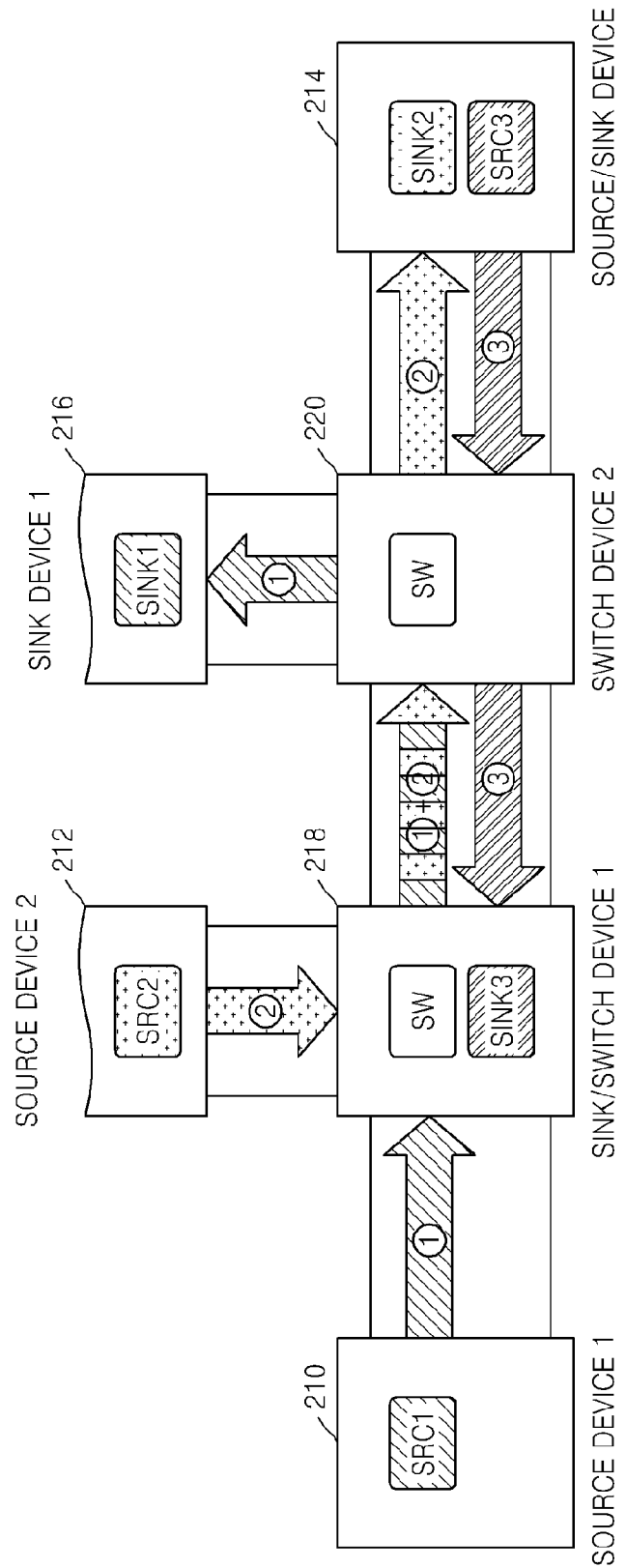
FIG. 2A is a diagram showing bidirectional transmission of data based on an AV interface, according to an exemplary embodiment.

FIG. 2A is a diagram showing bidirectional transmission of data based on an AV interface, according to an exemplary embodiment.

Referring to FIG. 2A, AV data (e.g., uncompressed video data) of a source device1 210 (e.g., a BDP) may be reproduced by a sink device1 216 (e.g., a projector), AV data of a source device2 212 (e.g., a STB) may be reproduced by a source/sink device 214 (e.g., a personal computer (PC)), and AV data of the source/sink device 214 may be reproduced by a sink/switch device1 218 (e.g., a TV).

The sink/switch device1 218 receives the AV data of the source device1 210 and the AV data of the source device2 212 from the source device1 210 and the source device2 212, and transmits the received AV data to a switch device2 220 after performing time division duplexing.

The switch device2 220 receives the AV data of the source device1 210 and the AV data of the source device2 212, relays the received data to transmit the AV data of the source device1 210 to the sink device1 216, and to transmit the AV data of the source device2 212 to the source/sink device 214. Also, the switch device2 220 receives the AV data from the source/sink device 214, and transmits the received AV data to the switch device1 218.

In considerations of links between the sink/switch device1 218 and the switch device2 220 and between the switch device2 220 and the source/sink device 214, AV data, e.g., uncompressed video data, is not transmitted only in one directional but is transmitted in two directions. Accordingly, each exemplary device illustrated in FIG. 2A is connected via one AV interface cable, an AV interface may perform bidirectional data transmission via one cable, and may transmit AV data received from a plurality of source devices, by using a time division duplexing method.

Figure 2B:
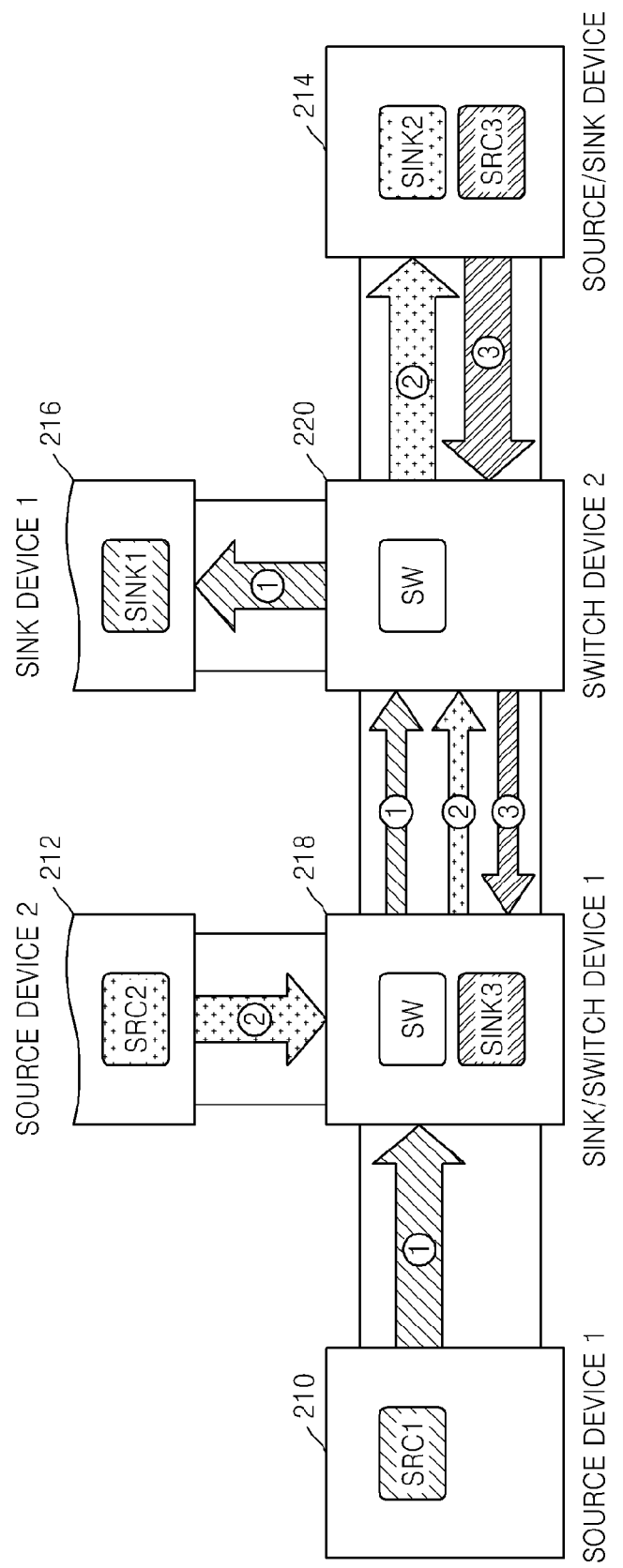
FIG. 2B is a diagram showing bidirectional transmission of data based on an AV interface, according to another exemplary embodiment.

FIG. 2B is a diagram showing bidirectional transmission of data based on an AV interface, according to another exemplary embodiment.

Referring to FIG. 2B, AV data (e.g., uncompressed video data) of the source device1 210 (e.g., a BDP) may be reproduced by the sink device1 216 (e.g., a projector), AV data of the source device2 212 (e.g., a STB) may be reproduced by the source/sink device 214 (e.g., a PC), and AV data of the source/sink device 214 may be reproduced by the sink/switch device1 218 (e.g., a TV).

Although an exemplary method of transmitting and receiving data by using a time division duplexing method is illustrated in FIG. 2A, a method of transmitting and receiving data by using a space division duplexing method is illustrated in FIG. 2B. As will be described later in relation to FIG. 4, an AV link based on an AV interface according to an exemplary embodiment may include a plurality of sub-links. Also, the sub-links may correspond to a plurality of spatially separate lanes representing physical connections between devices. Accordingly, as illustrated in FIG. 2B, AV data may be transmitted and received by using a space division duplexing method based on a plurality of sub-links.

For example, in FIG. 2B, the sink/switch device1 218 may transmit the AV data of the source device1 210 and the AV data of the source device2 212 by using two sub-links after performing space division duplexing. Likewise, when the AV data of the source/sink device 214 is received from the switch device2 220, another sub-link may be used.

An AV interface according to the related art, e.g., a DVI or an HDMI may not allow bidirectional transmission of AV data. Accordingly, a data transmission network may not be formed by using an AV interface as illustrated in FIG. 1. However, an AV interface according to an exemplary embodiment allows bidirectional data transmission via one cable as illustrated in FIGS. 2A and 2B and thus may allow formation of a flexible network in which various device are connected.

Referring back to FIG. 1, various types of data, e.g., Ethernet data and universal serial bus (USB) data, as well as AV data may be transmitted and received based on an AV interface according to an exemplary embodiment. A case when a laptop computer 160 of the room2 120 transmits Ethernet data via a wireless router 159 of the room1 110 to a PC 161 of the room3 130 will be described by way of an example. The Ethernet data refers to data generally transmitted via a transmission control protocol/Internet protocol (TCP/IP)-based local area network (LAN).

However, unlike an AV interface according to the related art, since an AV interface according to an exemplary embodiment supports bidirectional data transmission, Ethernet data may be transmitted and received based on an AV interface. Accordingly, the laptop computer 160 transmits the Ethernet data to the PC 161 in a network formed by using AV links. For this, switch devices in the exemplary network illustrated in FIG. 1 have a function of relaying Ethernet data. By switching link layers, the Ethernet data is transmitted from the wireless router 159 to the PC 161.

According to another exemplary embodiment, when USB data of a camera 162 is transmitted to the laptop computer 160, the switch devices transmit the USB data to the laptop computer 160 by using a function of switching the USB data. Since various types of data as well as AV data are transmitted based on an AV interface, various devices may accesses a network connected based on an AV interface and may freely transmit and receive data. The switch devices relay the USB data by switching link layers.

Also, data for controlling a device and a network may also be transmitted and received based on an AV interface according to an exemplary embodiment. For example, a user may control the AVR 152 of the room1 110 by using the TV 153 of the same room. The user controls the AVR 152 by manipulating the TV 153 and transmitting data for controlling the AVR 152 based on an AV interface. Also, the TV 156 or the STB 158 of the room4 140, which accesses a network formed from an AV interface, may also be controlled based on the AV interface.

Since the data for controlling a network connected based on an AV interface may also be transmitted and received using the AV interface, as the data for controlling the network, data for managing the network as well as data for setting links may also be transmitted and received by using the AV interface.

Since various types of data are transmitted and received by using an AV interface, a transmission unit of an AV network may include information regarding a data type. The information regarding the data type may be included in a header of the transmission unit of the AV network.

Furthermore, power may also be transmitted by using an AV interface according to an exemplary embodiment. Predetermined power may be transmitted via an AV link, e.g., USB interface, to a mobile device. As such, power for charging or operating the mobile device is transmitted.

Figure 3:
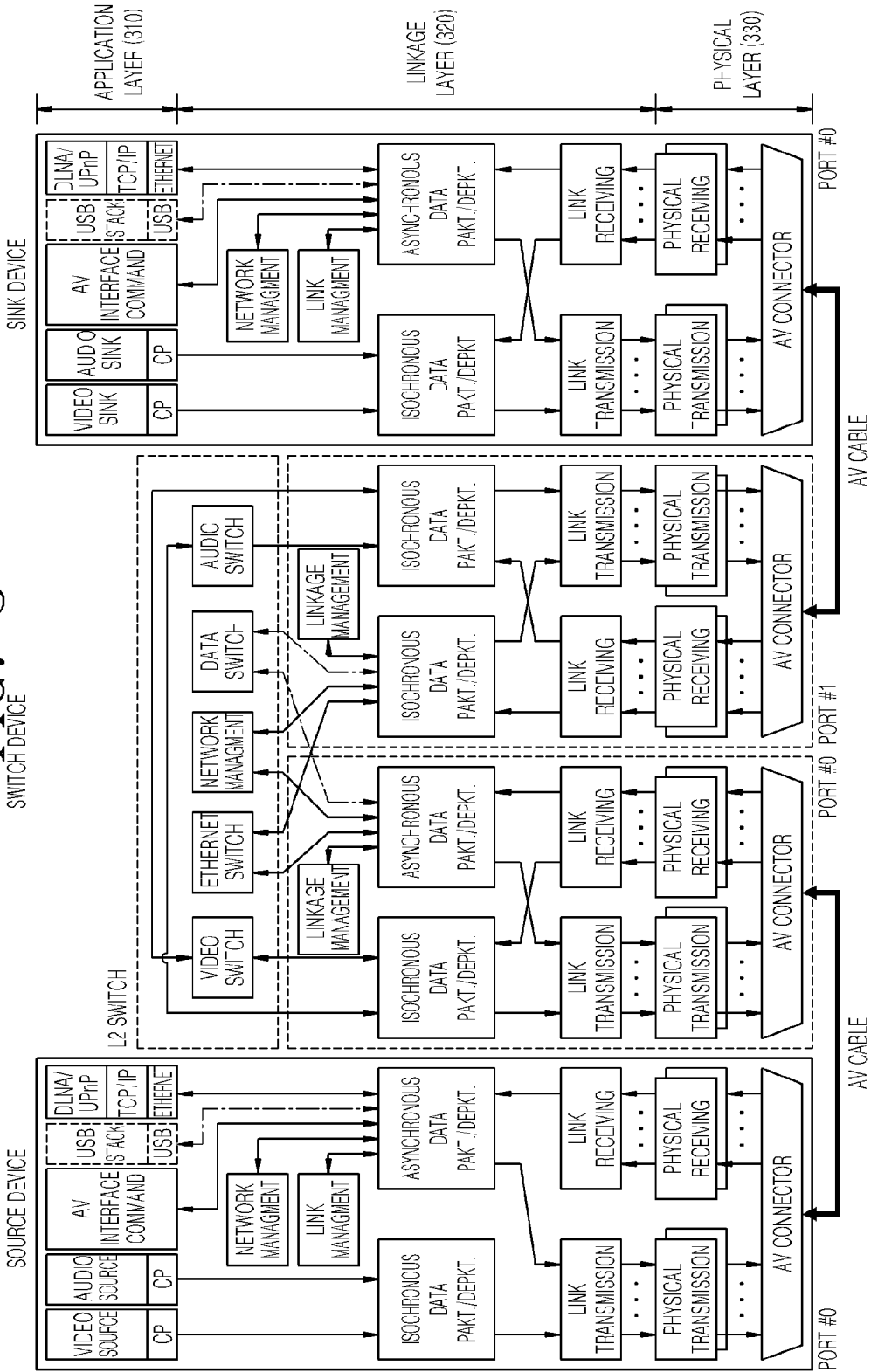
FIG. 3 is a diagram showing a hierarchical structure of a network based on an AV interface, according to an exemplary embodiment.

FIG. 3 is a diagram showing a hierarchical structure of an AV network, according to an exemplary embodiment.

In order to transmit various types of data in two directions based on an AV interface according to an exemplary embodiment as described above in relation to FIG. 1, the hierarchical network structure illustrated in FIG. 3 may be used.

Referring to FIG. 3, the hierarchical network structure includes an application layer 310, a link layer 320, and a physical layer 330.

The application layer 310 includes sub-layers related to processing of data transmitted and received using an AV interface.

The application layer 310 of a source device may include a video source layer for transmitting video data, an audio source layer for transmitting audio data, and a content protection (CP) layer for protecting copyrights of AV contents, may also include an Ethernet layer for transmitting Ethernet data, a TCP/IP layer, and a digital living network alliance (DLNA)/universal plug and play (UPnP) layer, and may further include a USB stack for transmitting USB data, and an AV interface command layer for controlling an AV network.

Likewise, the application layer 310 of a sink device may include a video sink layer for receiving video data, an audio sink layer for receiving audio data, and a CP layer for protecting copyrights of AV contents, may also include an Ethernet layer for receiving Ethernet data, a TCP/IP layer, and a DLNA/UPnP layer, and may further include a USB stack for transmitting USB data, and an AV interface command layer for transmitting control data.

The link layer 320 provides a function of accurately transmitting data of the application layer 310 to a target device. The link layer 320 includes an isochronous data pakt./depkt. layer for packetizing or depacketizing data that requires real-time transmission, e.g., audio data and video data, also includes an asynchronous data pakt./depkt. layer for packetizing or depacketizing data that does not require real-time transmission, e.g., Ethernet data, USB data, and network control data, and further includes a link management layer for managing AV links, and a network management layer for managing a network based on the AV links.

A switch device includes a video switch layer, an audio switch layer, an Ethernet switch layer, and a data switch layer for switching the link layer 320. The video switch layer and the audio switch layer determine a source address and a destination address of the link layer 320 based on the depacketization result of the isochronous data pakt./depkt. layer, and perform switching based on the determination result. Likewise, the Ethernet switch layer and the data switch layer determine a source address and a destination address of the link layer 320 based on the depacketization result of the asynchronous data pakt./depkt. layer, and perform switching based on the determination result.

The physical layer 330 is a layer for converting data of the link layer 320 into a physical signal to transmit the data via a cable. All of the source device, the switch device, and the sink device include the physical layer 330, and the physical layer 330 includes an AV connector, a physical transmission layer for transmitting data, and a physical reception layer for receiving data.

The isochronous data pakt./depkt. layer or the asynchronous data pakt./depkt. layer of the link layer 320 may transmit packetized data to a link transmission layer, and the link transmission layer may multiplex and transmit the packetized data to the physical layer 330. As described above in relation to FIG. 2B, an AV link according to an exemplary embodiment may include a plurality of sub-links to perform space division duplexing, and an AV cable may include a plurality of spatially separate lanes corresponding to the sub-links. Accordingly, the link transmission layer may multiplex the packetized data, may allocate the multiplexed data to the lanes, and then may transmit the allocated data to a plurality of physical transmission layers corresponding to the lanes.

On the other hand, data received by a plurality of physical reception layers corresponding to the lanes may be transmitted to the link reception layer, and link reception layer may demultiplex and transmit the data received from the physical reception layers, to the isochronous data pakt./depkt. layer or the asynchronous data pakt./depkt. layer. The isochronous data pakt./depkt. layer or the asynchronous data pakt./depkt. layer depacketizes and transmits the received data to the application layer 310 or switch layers.

Exemplary transmission and reception of data according to the hierarchical network structure illustrated in FIG. 3 are performed based on an address allocated to each device in an AV network. In order to identify devices connected based on an AV interface, a predetermined address is allocated to each device and data is transmitted and received based on the allocated address.

Figure 4:
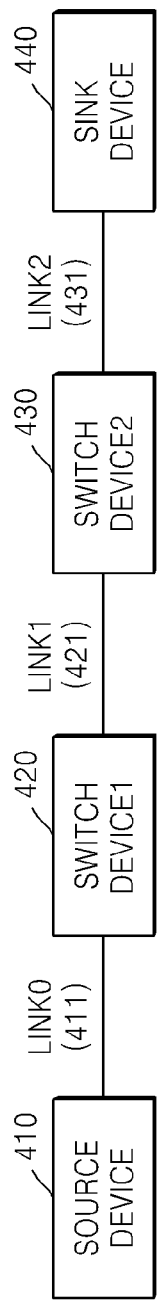
FIG. 4 is a diagram showing a data transmission path according to an exemplary embodiment.

FIG. 4 is a diagram showing a data transmission path according to an exemplary embodiment.

Referring to FIG. 4, in a network established based on an AV interface as illustrated in FIG. 1, in some cases, predetermined data is transmitted from a source device 410 to a sink device 440 via a switch device1 420 and a switch device2 430. If the source device 410 and the sink device 440 are not directly connected, the switch device1 420 and the switch device2 430 have to relay the data transmitted from the source device 410 to the sink device 440.

In FIG. 4, two switch devices (the switch device1 420 and the switch device2 430) exist between the source device 410 and the sink device 440. As such, A/V links are established based on an AV interface.

The data transmitted from the source device 410 to the sink device 440 is a stream and requires real-time transmission. In order to transmit the steam while maintaining the quality of service (QoS), the link0 411, the link1 421, and the link2 431 have to secure bandwidth for transmitting the stream. As described above in relation to FIGS. 2A and 2B, switch devices relay data transmitted from a plurality of source devices by multiplexing the relayed data by using a time or space division duplexing method. However, if the switch device1 420 and the switch device2 430 currently relay a large amount of data and thus a bandwidth needed to relay the stream transmitted from the source device 410 to the sink device 440 is unavailable, the quality of a streaming service may be greatly reduce or the streaming service itself may be disabled.

Accordingly, the source device 410 needs to secure bandwidth of the data transmission path before transmitting the stream to the sink device 440. The bandwidth of the data transmission path is determined based on the smallest bandwidth from among bandwidths of the link0 411, the link1 421, and the link2 431. An exemplary method of securing a bandwidth of a data transmission path will now be described in detail with reference to FIGS. 5 and 6.

Figure 5:
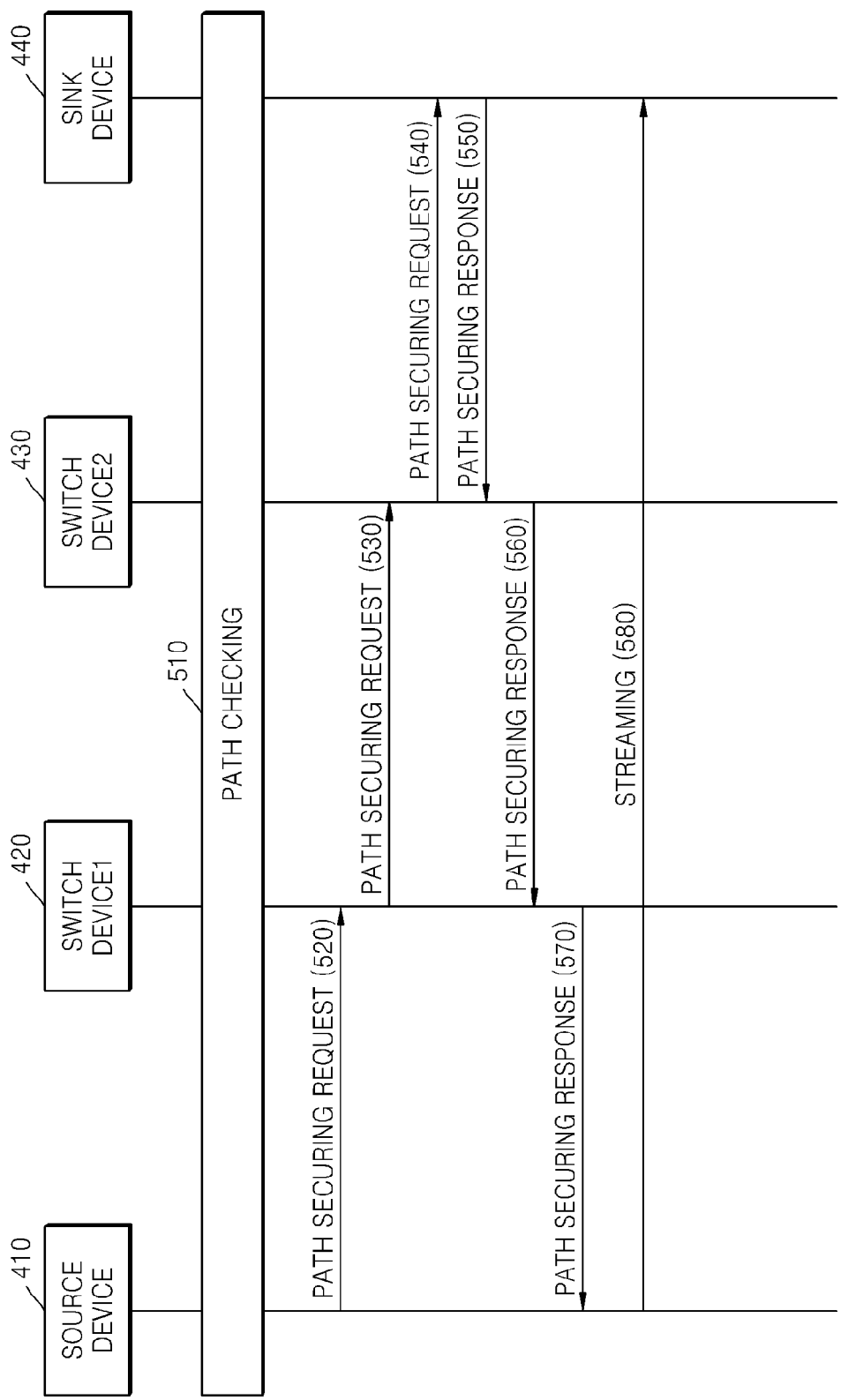
FIG. 5 is a flowchart illustrating a streaming method according to an exemplary embodiment.

FIG. 5 is a flowchart illustrating a streaming method according to an exemplary embodiment.

Referring to FIG. 5, before the source device 410 transmits a stream to the sink device 440 to start a streaming service, in operation 510, the source device 410 checks a data transmission path to the sink device 440 whether a bandwidth of the data transmission path is sufficient to execute the streaming service. Operation 510 will be described in greater detail further below with reference to FIG. 6.

If the data transmission path supports the streaming service in operation 510, in operation 520, the source device 410 requests the switch device1 420 to secure the data transmission path.

Although the data transmission path supports the streaming service in operation 510, after the data transmission path is checked, a change may occur in available bandwidths of the link0 411 (shown in FIG. 4). For example, after the data transmission path is checked in operation 510, and before a bandwidth for the streaming service is allocated, the switch device1 420 may relay other data and thus an available resource of the switch device1 420 may not be used for the streaming service.

Accordingly, in operation 520, the source device 410 requests the switch device1 420 to secure the data transmission path. According to a request of the switch device1 420, a resource (e.g., a bandwidth) of the link0 411 (shown in FIG. 4) is allocated to the steam transmitted from the source device 410.

If the source device 410 requests the switch device1 420 to secure the data transmission path in operation 520, the source device 410 and the switch device1 420 secure the resource of the link0 411 (shown in FIG. 4) by transmitting and receiving data for controlling a network.

The resource of the link0 411 (shown in FIG. 4) is secured by performing link training and bandwidth allocation. The link training includes processes for setting a link, e.g., initialization of the link0 411 (shown in FIG. 4), setting of a link parameter, clock synchronization, and channel equalization. The bandwidth allocation refers to allocation of transmission units and will be described in greater detail below with reference to FIG. 8.

If the resource of the link0 411 (shown in FIG. 4) is secured, in operation 530, the switch device1 420 relays to the switch device2 430 the request received in operation 520 to secure the data transmission path. The switch device1 420 requests the switch device2 430 to secure the data transmission path, and the switch device1 420 and the switch device2 430 secure a resource of the link1 421 (shown in FIG. 4) by transmitting and receiving data for controlling a network. As in operation 520, the resource of the link1 421 (shown in FIG. 4) is secured by performing link training and bandwidth allocation.

If the resource of the link1 421 (shown in FIG. 4) is secured, in operation 540, the switch device2 430 relays to the sink device 440 the request received in operation 530 to secure the data transmission path. The switch device2 430 requests the sink device 440 to secure the data transmission path, and the switch device2 430 and the sink device 440 secure a resource of the link2 431 (shown in FIG. 4) by transmitting and receiving data for controlling a network. As in operation 530, the resource of the link2 431 (shown in FIG. 4) is secured by performing link training and bandwidth allocation.

In operations 550, 560, and 570, the sink device 440 transmits to the source device 410 a response to the request received in operations 520, 530, and 540 to secure the data transmission path.

If resources of all links of the data transmission path are secured in operations 520, 530, and 540, a response including information representing that the securing of the data transmission path is succeeded is transmitted to the source device 410. In operation 580, the streaming service is executed.

However, if any one of the link0 411, the link1 421, and the link2 431 (shown in FIG. 4) does not support the streaming service, the response transmitted in operations 550, 560, and 570 includes information representing that the securing of the data transmission path is failed. If the securing of the data transmission path is failed, already secured resources of links are released and return to previous states i.e., to the states in which they were prior to being secured.

For example, although the resources of the link0 411 (shown in FIG. 4) and the link1 421 (shown in FIG. 4) are secured for the streaming service, if the resource of the link2 431 (shown in FIG. 4) is not secured and thus the data transmission path is not secured, the already secured resources of the link0 411 and the link1 421 (shown in FIG. 4) return to previous states i.e., to the states in which they were prior to being secured. The link training is canceled, and the bandwidth allocation for the streaming service is canceled.

Figure 6:
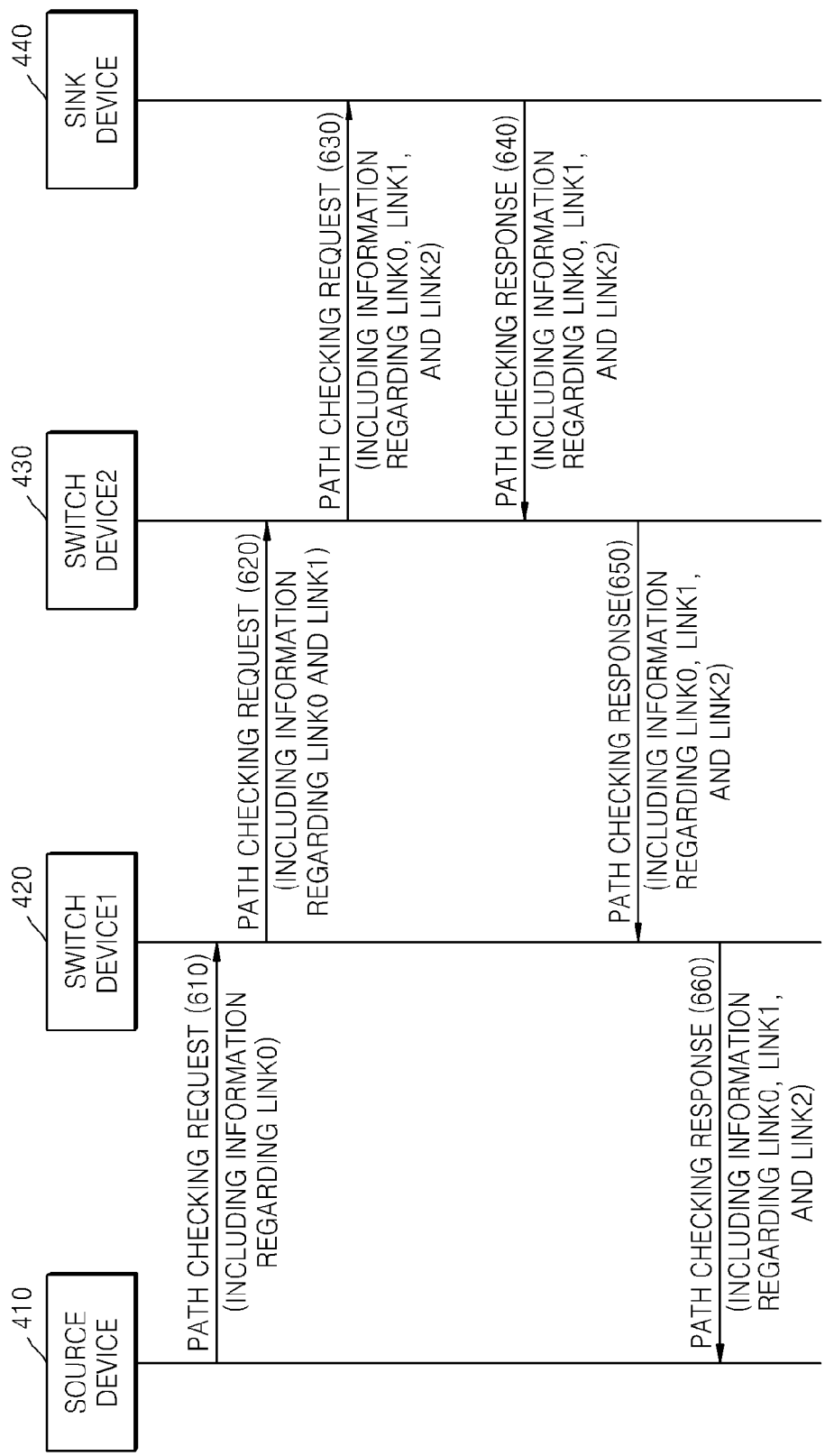
FIG. 6 is a flowchart illustrating a method of checking a data transmission path, according to an exemplary embodiment.

FIG. 6 is a flowchart illustrating a method of checking a data transmission path, according to an exemplary embodiment. FIG. 6 shows operation 510 of FIG. 5 in greater detail.

Referring to FIG. 6, in operation 610, the source device 410 requests the switch device1 420 to check the data transmission path. The request includes information regarding a resource (e.g., a bandwidth) required to execute the streaming service, and information (e.g., information regarding an available bandwidth) regarding the link0 411 between the source device 410 and the switch device1 420.

In operation 620, the switch device1 420 relays the request received in operation 610 to the switch device2 430. Before the request is relayed, information regarding the link1 421 (shown in FIG. 4) between the switch device1 420 and the switch device2 430 is further included in the request. In other words, the request transmitted in operation 620 includes the information regarding a resource required for the streaming service, the information regarding the link0 411 (shown in FIG. 4), and the information regarding and the link1 421 (shown in FIG. 4).

In operation 630, the switch device2 430 relays the request received in operation 620 to the sink device 440. Before the request is relayed, information regarding the link2 431 (shown in FIG. 4) between the switch device2 430 and the sink device 440 is further included in the request. In other words, the request transmitted in operation 630 includes the information regarding a resource required for the streaming service, the information regarding the link0 411 (shown in FIG. 4), the information regarding and the link1 421 (shown in FIG. 4), and the information regarding the link2 431 (shown in FIG. 4).

The sink device 440 determines whether the data transmission path is valid based on the request received in operation 630. Whether the data transmission path is valid may be determined by comparing the information regarding a resource required for the streaming service, to the information regarding the link0 411, the information regarding and the link1 421, and the information regarding the link2 431, (shown in FIG. 4).

If a bandwidth required for the streaming service is less than an available bandwidth of the link0 411, an available bandwidth of the link1 421, and an available bandwidth of the link2 431, it may be determined that the data transmission path is valid.

If it is determined that the data transmission path is valid, in operations 640, 650, and 660, a response including information representing that the data transmission path is valid is transmitted to the source device 410. In this case, information regarding all links of the data transmission path may be included in the response. In other words, information regarding the available bandwidth of the link0 411, the available bandwidth of the link1 421, and the available bandwidth of the link2 431 may be included in the response.

If it is determined that the data transmission path is invalid, in operations 640, 650, and 660, a response including information representing that the data transmission path is invalid is transmitted to the source device 410. Even in this case, information regarding all links of the data transmission path may be included in the response.

Figure 7:
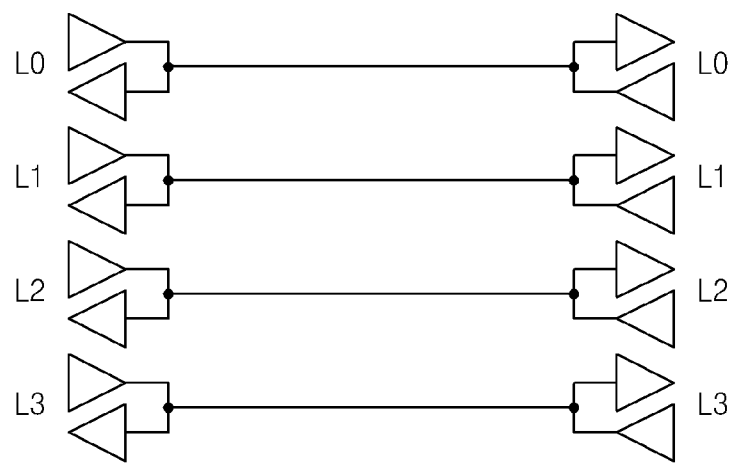
FIG. 7 is a diagram showing an AV link according to an exemplary embodiment.

FIG. 7 is a diagram showing an AV link according to an exemplary embodiment.

Referring to FIG. 7, an AV link established based on an AV interface, according to an exemplary embodiment, may include a plurality of lanes. Each lane represents a physical connection between devices and may correspond to a twisted pair (TP). Bidirectional data communication is allowed via each lane.

The exemplary bandwidth allocation performed in operations 520, 530, and 540 illustrated in FIG. 5 refers to allocation of one or more of a plurality of lanes illustrated in FIG. 7, to a stream. Exemplary detailed descriptions thereof will now be provided with reference to FIGS. 8, 9A, and 9B.

Figure 8:
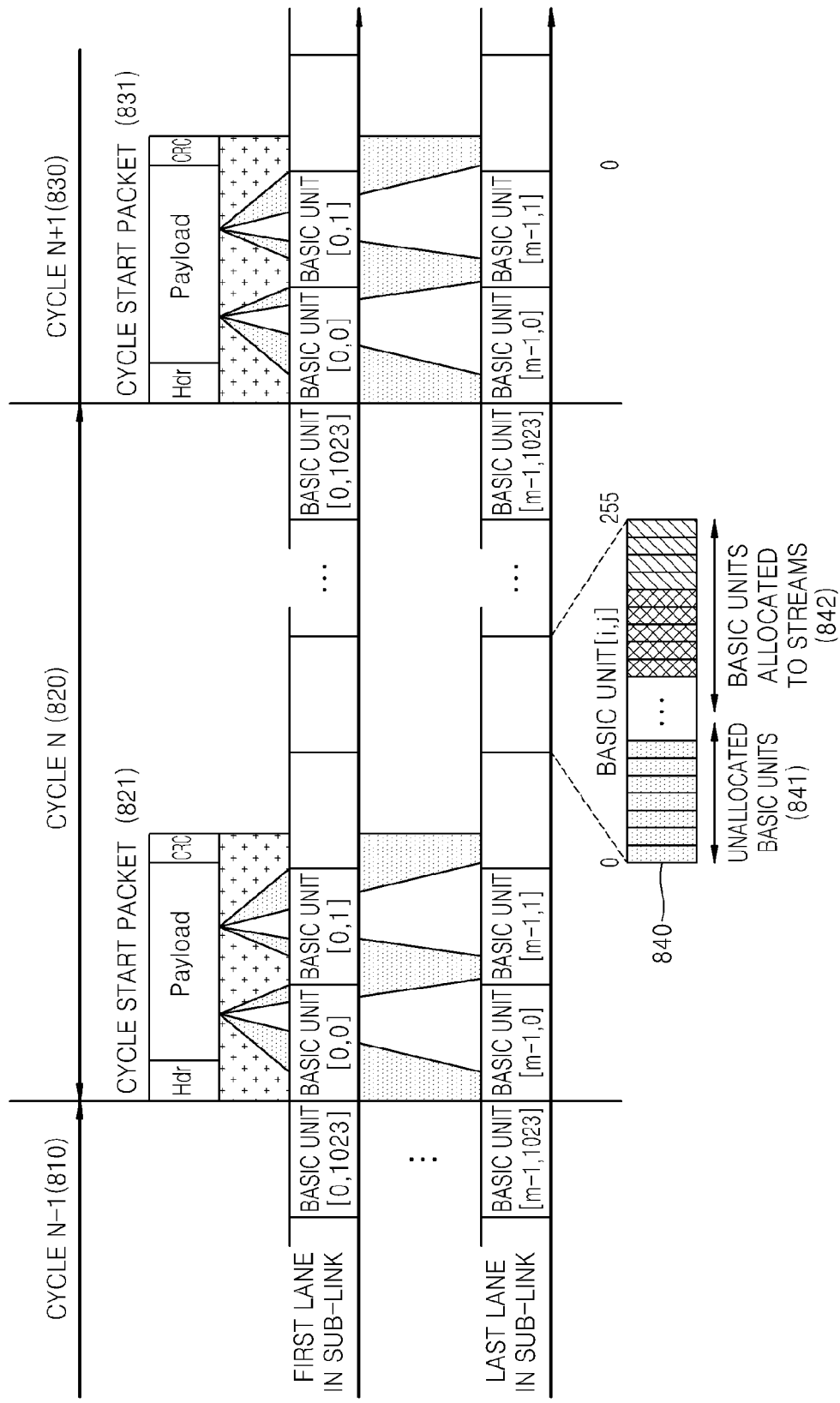
FIG. 8 is a diagram showing a method of allocating transmission units, according to an exemplary embodiment.

FIG. 8 is a diagram showing a method of allocating transmission units, according to an exemplary embodiment.

In FIG. 8, allocation of transmission units to a forward sub-link when a direction from the source device 410 to the sink device 440 is a forward direction will be described by way of an example.

Referring to FIG. 8, bandwidth allocation refers to allocation of transmission units to a stream transmitted by the source device 410 via each link. A transmission unit includes a plurality of basic units, and refers to a unit of data transmission.

One cycle 810, 820, or 830 may include a plurality of transmission units (e.g., 1024 transmission units), and the transmission units may be simultaneously transmitted via a plurality of lanes. Also, each transmission unit may include a plurality of basic units (e.g., 256 basic units), and a basic unit refers to a minimum data unit. For example, a basic unit of image data having a bit depth of 8 bits may be 8 bits. However, since an 8-bit basic unit may be channel-coded to be transmitted and received between devices, the channel-coded basic unit may be bits greater than 8 bits (e.g., 10 bits).

The cycle 810, 820, or 830 refers to a cycle in which allocation of transmission units is changed. The allocation of transmission units may be changed in a cycle, but may not be changed while a streaming service is in process. The forward sub-link from the source device 410 to the sink device 440 may include a plurality of lanes, and the allocation of transmission units may be set differently with respect to each lane, or may be set the same with respect to all lanes.

Transmission units are allocated by allocating a plurality of basic units included in one transmission unit 840 to predetermined data. For example, a plurality of basic units included in the transmission unit 840 may be allocated to a stream transmitted by the source device 410. The allocated basic units 842 may be transmitted with the remaining unallocated basic units 841 in one basic unit 840.

Since allocation of transmission units may be changed in each cycle 810, 820, or 830, as described above, information regarding the allocation of transmission units may be included in a cycle start packet 821 or 831 when each cycle 810, 820, or 830 is started, and may be transmitted to a device connected via an AV link at another end. The device at the other end may receive the information regarding the allocation of transmission units in the cycle start packet 821 or 831 of the cycle 810, 820, or 830, and may extract from a received transmission unit only basic units corresponding to the stream transmitted by the source device 410 based on the received information. The cycle start packet 821 or 831 may be included in at least one transmission unit initially transmitted on each cycle 810, 820, or 830 as illustrated in FIG. 8.

FIGS. 9A and 9B are diagrams showing a method of allocating transmission units to a stream, according to an exemplary embodiment.

Referring to FIG. 9A, if a forward sub-link includes a lane L0, a bandwidth may be allocated by allocating some basic units 910 of a transmission unit transmitted via the lane L0 to a stream transmitted by the source device 410. Specifically, basic units 163 to 255 are allocated to the stream A.

Also, as illustrated in FIG. 9B, if a forward sub-link includes lanes L0, L1, and L2, a bandwidth may be allocated by allocating some basic units 920 of transmission units transmitted via the lanes L0, L1, and L2 to a stream transmitted by the source device 410. Specifically, basic units 244 to 255 of lanes L0, L1, and L2 are allocated to the stream A.

Figure 10:
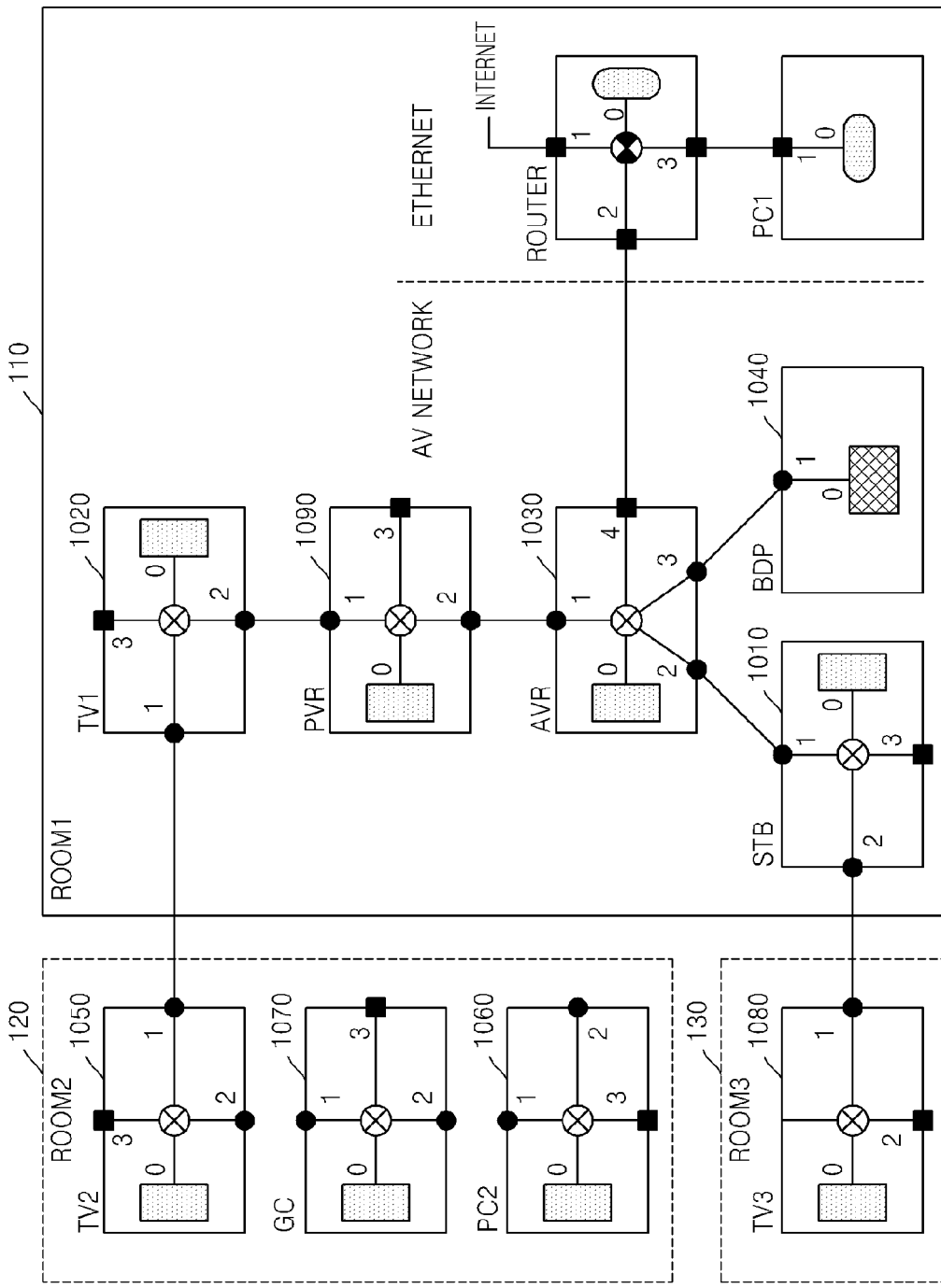
FIG. 10 is a diagram showing devices in a network established based on an AV interface, according to an exemplary embodiment.

FIG. 10 is a diagram showing devices in a network established based on an AV interface, according to an exemplary embodiment.

In FIG. 10, marked numbers refer to numbers of ports, and black circles refer to ports of an AV network. All number-0 ports refer to ports having a host function, and black rectangles refers to Ethernet ports. Circles with X refer to switches for relaying transmitted and received data in an AV network. However, a router switch refers to an Ethernet switch for relaying only Ethernet data.

In order to execute the streaming service in operation 580 illustrated in FIG. 5, devices in an AV network established based on an AV link have to accurately relay a stream of the source device 410 to the sink device 440. For this, the devices in the AV network illustrated in FIG. 10 receive the stream via a port mapped to the source device 410 and transmit the stream via a port mapped to the sink device 440. In this case, each device may relay the stream with reference to forwarding tables in which ports and streams are mapped. The exemplary forwarding tables will now be described with reference to FIGS. 11A through 11I.

FIGS. 11A through 11I are forwarding tables for relaying streams, according to an exemplary embodiment.

When a total of five streams are transmitted and received among the exemplary devices illustrated in FIG. 10, for example, when a STB 1010 transmits a stream A to a TV1 1020, the TV1 1020 transmits a stream B to an AVR 1030, a BDP 1040 transmits a stream C to a TV2 1050, the STB 1010 transmits a stream D to a PC2 1060, and a GC 1070 transmits a stream E to a TV3 1080, FIG. 11A is an exemplary forwarding table of the STB 1010, FIG. 11B is an exemplary forwarding table of the AVR 1030, FIG. 11C is an exemplary forwarding table of a personal video recorder (PVR) 1090, FIG. 11D is an exemplary forwarding table of the TV1 1020, FIG. 11E is an exemplary forwarding table of the TV2 1050, FIG. 11F is an exemplary forwarding table of the GC 1070, FIG. 11G is an exemplary forwarding table of the PC2 1060, FIG. 11H is an exemplary forwarding table of the TV3 1080, and FIG. 11I is an exemplary forwarding table of the BDP 1040.

A Source Address item defines an address of a source device in an AV network for the five streams. A Stream Index item defines identifiers for identifying a plurality of streams transmitted by one source device, and In Port and Out Port items respectively define a port for receiving a stream and a port for transmitting a stream. A BW item defines a bandwidth required to transmit and receive each stream.

Figure 12:
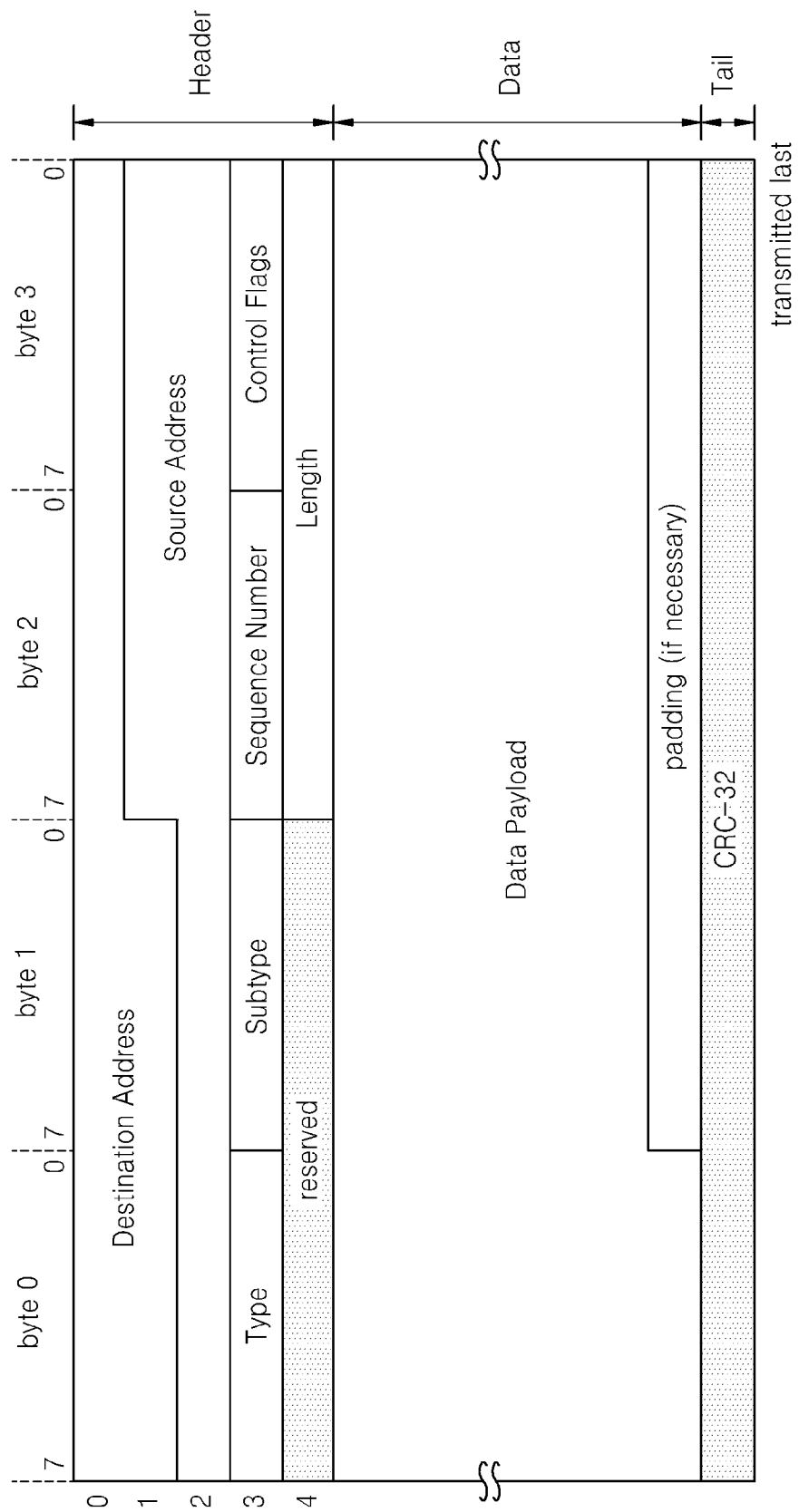
FIG. 12 is a diagram showing an asynchronous data packet according to an exemplary embodiment.

FIG. 12 is a diagram showing an asynchronous data packet according to an exemplary embodiment.

Request and responses transmitted and received between devices in operations 520, 530, 540, 550, 560, 570, and 580 illustrated in FIG. 5, operations 620, 630, 640, 650, and 660 illustrated in FIG. 6 are requests and responses transmitted and received to control a network and correspond to the above-mentioned asynchronous data. FIG. 12 is a view shows the structure of an asynchronous data packet according to an exemplary embodiment.

Referring to FIG. 12, a "Header" of the asynchronous data packet transmitted and received in an AV network includes a "Destination Address" field indicating an AV network address of a destination, and a "Source Address" field indicating an AV network address of a source. A "Type" field which defines the type of the asynchronous data packet, and includes information representing whether the asynchronous data packet is a packet for managing a link layer, a packet including an Ethernet frame, a packet including a command for controlling an application layer, or an acknowledgement (ACK) packet for acknowledging whether data is received. A "SubType" field is used to define a detailed type that is more specific than the type defined in the "Type" field.

Figure 13:
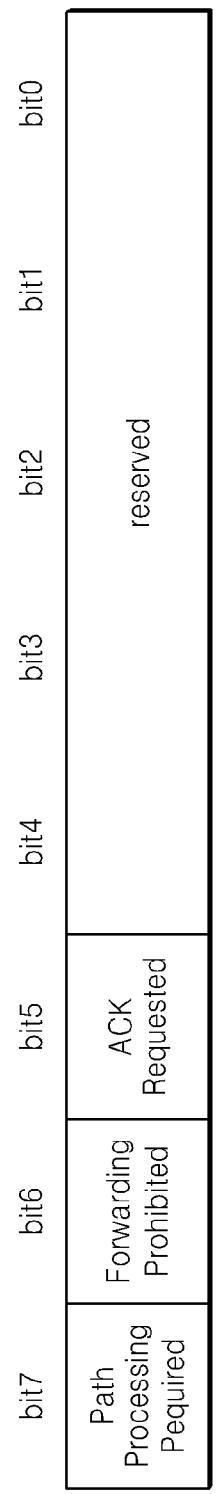
FIG. 13 is a diagram showing a Control Flags field included in a header of an asynchronous data packet, according to an exemplary embodiment.

A "Control Flags" field defines flags for controlling a packet, as illustrated by way of an example in FIG. 13. Referring to FIG. 13, the "Control Flags" field may include a "Path Processing Required" field, a "Forwarding Prohibited" field, and an "ACK Requested" field. The "Path Processing Required" field represents that the asynchronous data packet is a packet to be processed and/or modified by a device that receives the packet, the "Forwarding Prohibited" field prohibits the asynchronous data packet from being relayed, and the "ACK Requested" field forcibly requests a device that receives the asynchronous data packet, to send an acknowledgement response.

Referring back to FIG. 12, a "data" field of a transmission unit in an AV network includes substantially transmitted data. The data field carries data as data payload and also may include some padding if necessary. If the asynchronous data packet includes information regarding allocation of transmission units, the information regarding the allocation of transmission units is included in the "data" field.

Figure 14:
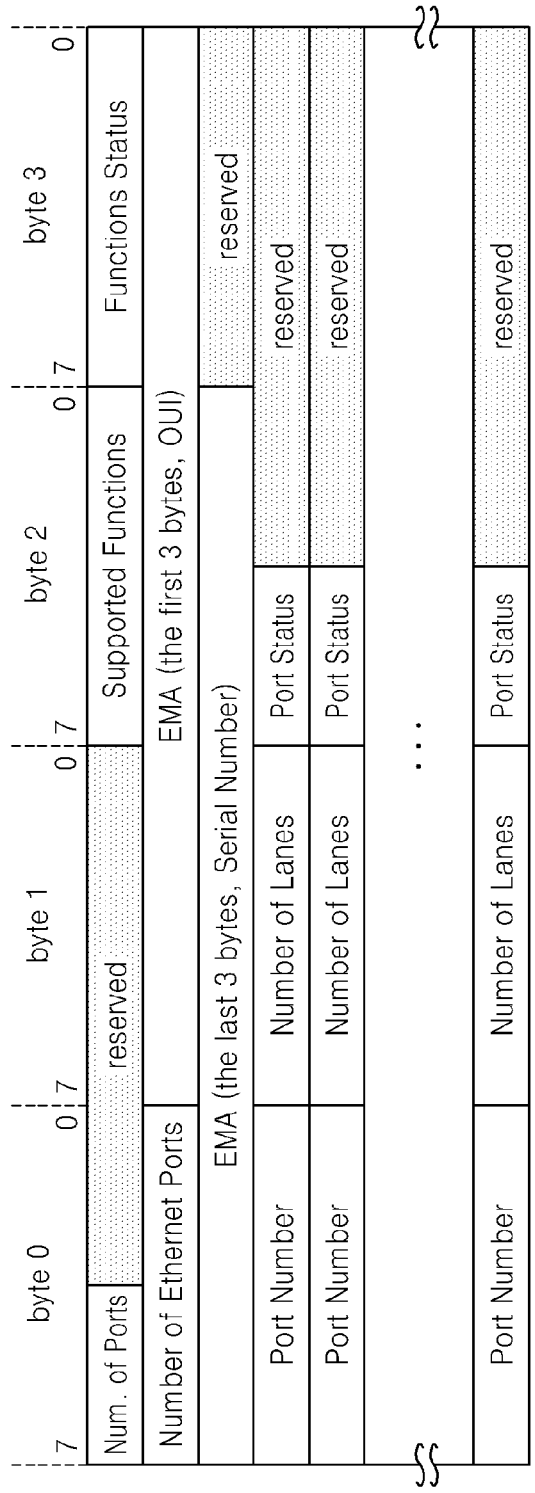
FIGS. 14 and 15 are diagrams showing a packet periodically transmitted by devices in an AV network, according to an exemplary embodiment.
Figure 15:
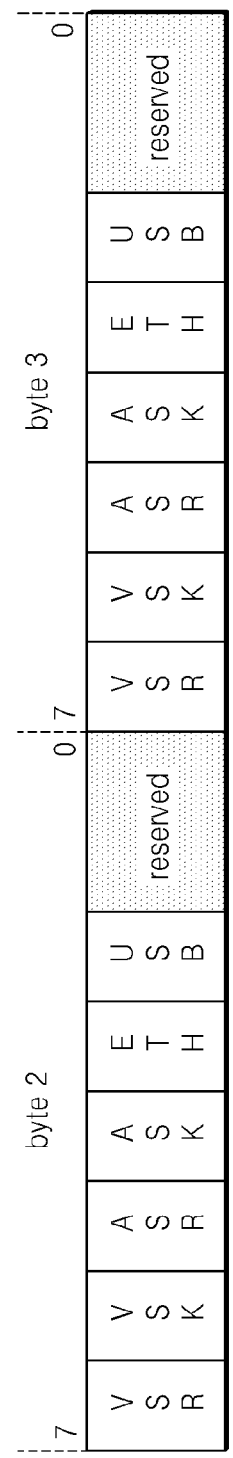

FIGS. 14 and 15 are diagrams showing a packet periodically transmitted by devices in an AV network, according to an exemplary embodiment.

As illustrated in FIGS. 1 and 10, in order to maintain a network established by using an AV interface, devices in the network have to notify other devices in the network about their presence. Accordingly, devices in an AV network periodically transmit a packet for notifying other devices about their presence as illustrated by way of an example in FIG. 14. The periodically transmitted packet illustrated in FIG. 14 is also a packet for controlling a network, corresponds to an asynchronous data packet, and may be included in the exemplary "data" field illustrated in FIG. 12 so as to be transmitted to other devices.

The exemplary presence packet may comprise of four bytes carrying a number of fields. For example, A "Num. of Ports" field defines a total number of ports of a device, and a "Number of Ethernet Ports" defines the number of Ethernet ports from among all ports. An "EMA" field defines an Ethernet address of a device, a "Port Number" field defines a number of a port, and a "Port Status" field defines a state of a port.

A "Number of Lanes" defines the number of lanes when one port includes a plurality of lanes as illustrated by way of an example in FIG. 7.

"Supported Functions" and "Function Status" fields respectively define functions supported by a device, and current states of the functions. Exemplary detailed descriptions of the function fields will now be provided with reference to FIG. 15.

Referring to FIG. 15, the "Supported Functions" field corresponds to a byte2, and includes a "VSR", "VSK", "ASR", "ASK", "ETH", and "USB" fields. The "VSR" field represents that a device may function as a video source, and the "VSK" field represents that a device may function as a video sink. The "ASR" and "ASK" fields respectively represent that a device may function as an audio source and an audio sink. The "ETH" field represents that a device has a function of transmitting and receiving Ethernet data. The "USB" field represents that a device has a function of transmitting and receiving USB data.

The "Function Status" field corresponds to a byte3, and represents whether the functions defined in the "Supported Functions" field are currently activated.

Figure 16:
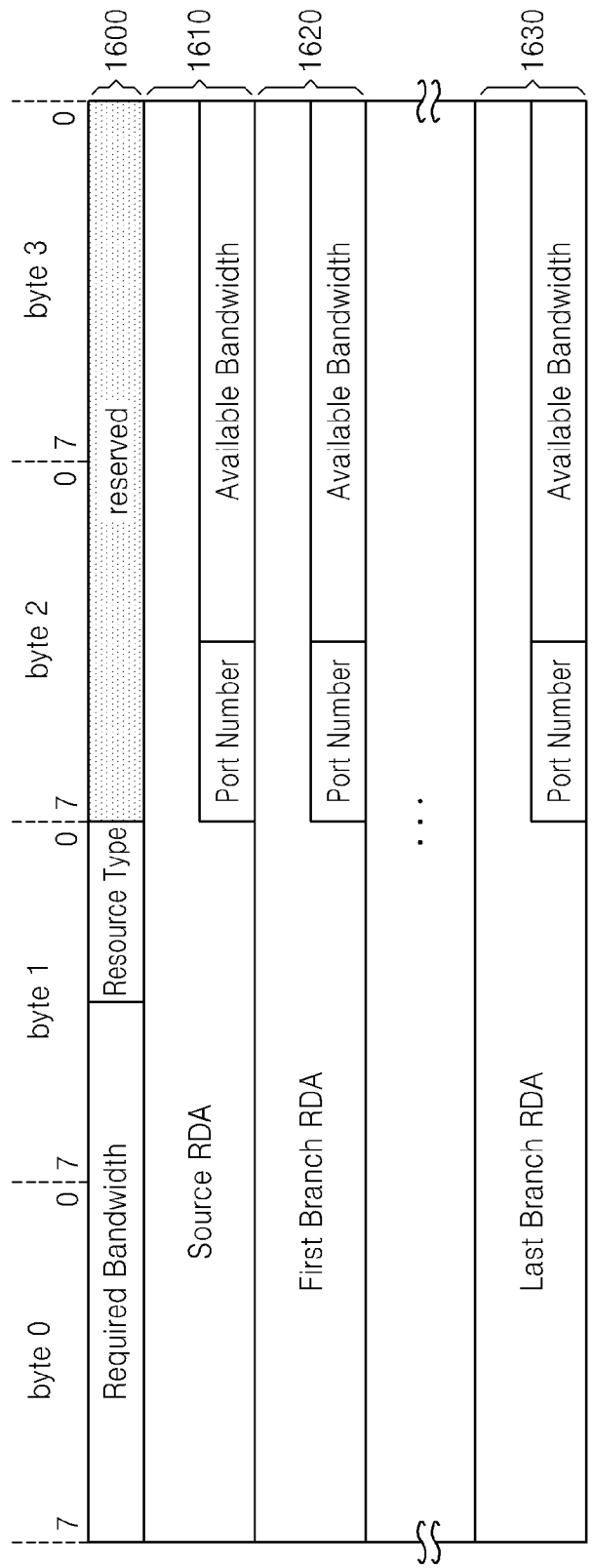
FIG. 16 is a diagram showing a packet for requesting to check a data transmission path, according to an exemplary embodiment.

FIG. 16 is a diagram showing a packet requesting to check a data transmission path, according to an exemplary embodiment.

FIG. 16 shows a packet requesting to check a data transmission path, which is transmitted from the source device 410 to the sink device 440 in operations 610 and 620 illustrated in FIG. 6, according to an exemplary embodiment. The packet requesting to check the data transmission path is also a packet for controlling a network, corresponds to an asynchronous data packet, and may be included in the "data" field illustrated in FIG. 12 to be transmitted to the sink device 440.

Referring to FIG. 16, a "Required Bandwidth" field defines a bandwidth required when the source device 410 executes a streaming service, and a "Resource Type" field defines the type of data transmitted by the source device 410. Since the source device 410 transmits a stream and the stream is isochronous data, the "Resource Type" field may be set to represent isochronous data.

A "Source RDA" field defines an AV network address of the source device 410, and a "Port Number" field defines a number of a port for transmitting a stream. An "Available Bandwidth" field defines an available bandwidth of a link included in the data transmission path.

If the source device 410 transmits to the switch device1 420 a request including a first line field 1600 and a second line field 1610 in operation 610 illustrated in FIG. 6, the switch device1 420 transmits the request to the switch device2 430 by adding a third line field 1620, and the switch device2 430 immediately prior to the sink device 440 transmits the request to the sink device 440 by adding a fourth line field 1630.

The "Available Bandwidth" field of the second line field 1610 defines an available bandwidth of the link0 411 (shown in FIG. 4), the "Available Bandwidth" field of the third line field 1620 defines an available bandwidth of the link1 421 (shown in FIG. 4), and the "Available Bandwidth" field of the fourth line field 1630 defines an available bandwidth of the link2 431 (shown in FIG. 4).

A "First Branch RDA" field defines an AV network address of the switch device1 420 (shown in FIG. 4), and a "Last Branch RDA" field defines an AV network address of the switch device2 430.

Figure 17:
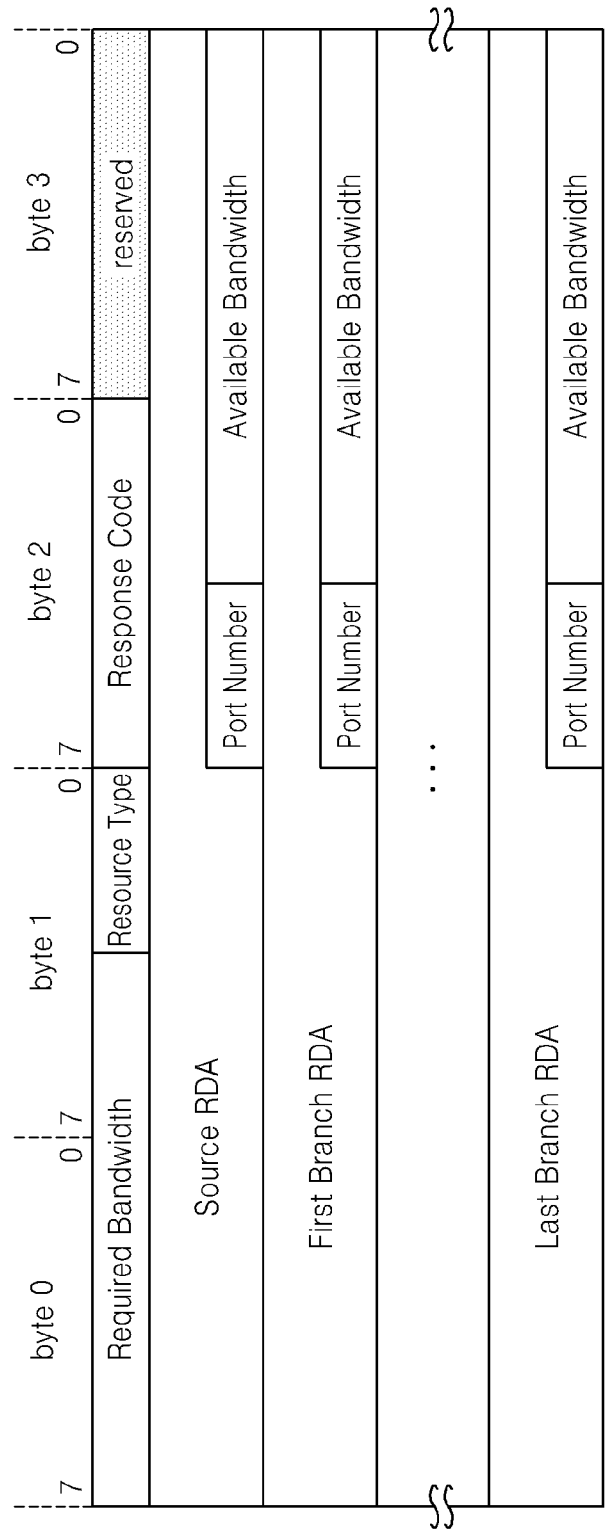
FIG. 17 is a diagram showing a response packet to a packet for requesting to check a data transmission path, according to an exemplary embodiment.

FIG. 17 is a diagram showing a response packet to a packet for requesting to check a data transmission path, according to an exemplary embodiment.

The sink device 440 (shown in FIG. 4) receives the packet for requesting to check the data transmission path as illustrated by way of an example in FIG. 16, and transmits the response packet to the source device 410 (shown in FIG. 4) as illustrated by way of an example in FIG. 17. A difference from the packet illustrated in FIG. 16 is that a "Response Code" field is added. The sink device 440 that receives the packet illustrated in FIG. 16 determines whether the data transmission path has a sufficient bandwidth for supporting a streaming service, with reference to the "Available Bandwidth" field included in the received packet, and defines information regarding a determination result in the "Response Code" field, thereby generating the response packet. The generated response packet is included in the "data" field illustrated in FIG. 12 to be transmitted to the source device 410 (shown in FIG. 4).

Figure 18:
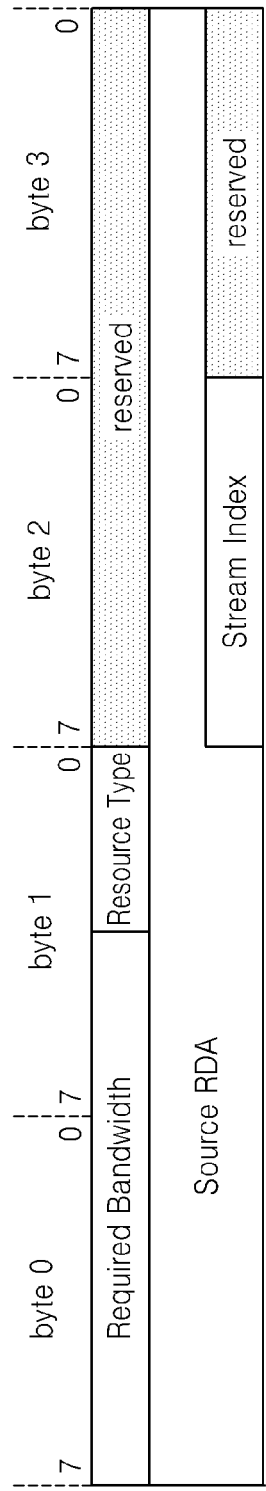
FIG. 18 is a diagram showing a packet for requesting to ensure a data transmission path, according to an exemplary embodiment.

FIG. 18 is a diagram showing a packet for requesting to ensure a data transmission path, according to an exemplary embodiment.

The source device 410 receives the response packet as illustrated in FIG. 17, and generates and transmits to the sink device 440 the packet for requesting to ensure the data transmission path as illustrated in FIG. 18. "Required Bandwidth", "Resource Type", and "Source RDA" fields are analogous to those exemplary fields illustrated in FIGS. 16 and 17. A "Stream Index" field identifies a stream, and is analogous to the exemplary Stream Index item illustrated in FIGS. 11A through 11I. The packet for requesting to ensure the data transmission path is also a packet for controlling a network, corresponds to an asynchronous data packet, and is included in the "data" field illustrated in FIG. 12 to be transmitted to the sink device 440.

Figure 19:
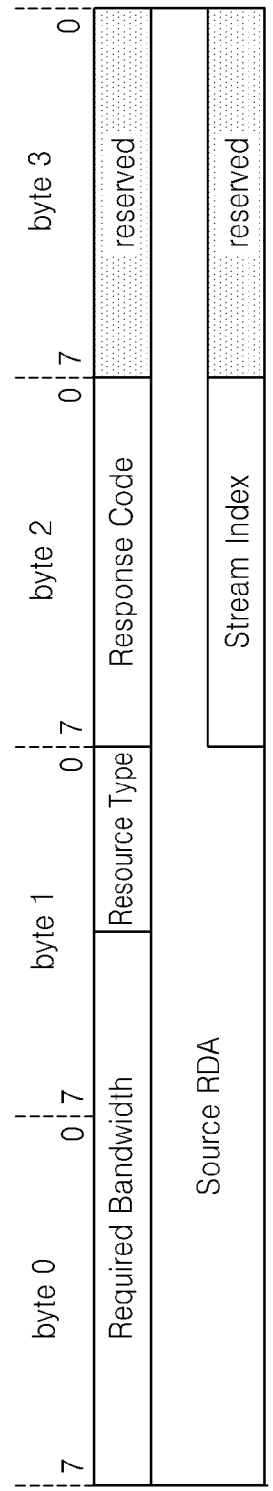
FIG. 19 is a diagram showing a response packet to a packet for requesting to ensure a data transmission path, according to an exemplary embodiment.

FIG. 19 is a diagram showing a response packet provided in response to a packet that is requesting to ensure a data transmission path, according to an exemplary embodiment.

The sink device 440 (shown in FIG. 4) receives the packet for requesting to ensure the data transmission path as illustrated by way of an example in FIG. 18, and transmits the response packet to the source device 410 (shown in FIG. 4) as illustrated in FIG. 19. A difference from the packet illustrated in FIG. 18 is that a "Response Code" field is added. If the data transmission path is secured in operations 520, 530, and 540 illustrated in FIG. 5, the response packet in which information representing that the securing of the data transmission path is succeeded is included in the "Response Code" field is transmitted to the source device 410 (shown in FIG. 4). Otherwise, if the data transmission path is not secured, the response packet in which information representing that the securing of the data transmission path is failed is included in the "Response Code" field is transmitted to the source device 410 (shown in FIG. 4).

The response packet illustrated in FIG. 19 is also a packet for controlling a network, and corresponds to an asynchronous data packet, and is included in the exemplary "data" field illustrated in FIG. 12 which is transmitted to the source device 410.

Figure 20:
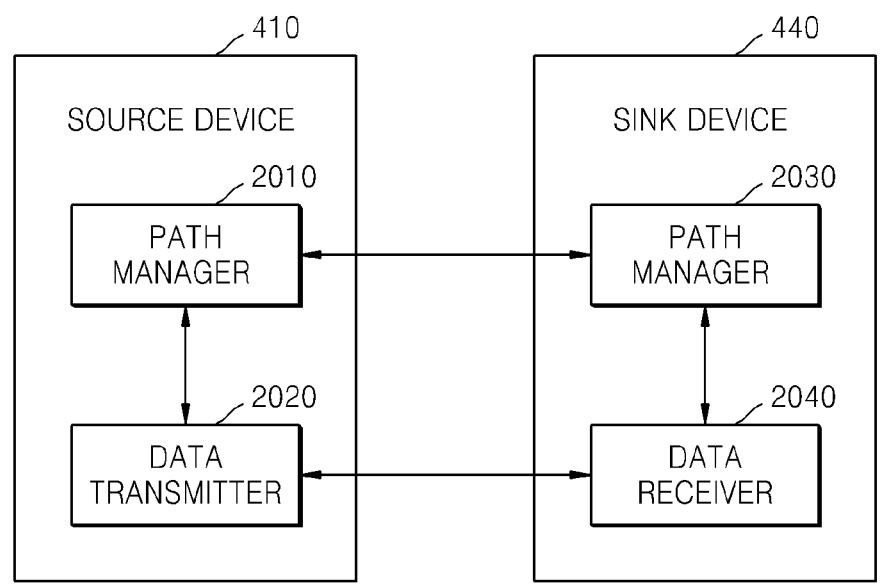
FIG. 20 is a diagram showing a data transmission apparatus and a data reception apparatus, according to an exemplary embodiment.

FIG. 20 is a diagram showing a data transmission apparatus and a data reception apparatus, according to an exemplary embodiment.

Referring to FIG. 20, the data transmission apparatus of the source device 410 includes a path manager 2010 and a data transmitter 2020, the data reception apparatus of the sink device 440 includes a path manager 2030 and a data receiver 2040.

The source path manager 2010 checks and secures a data transmission path in communication with the sink path manager 2030. The source path manager 2010 generates and transmits to the sink path manager 2030 a packet requesting to check for the data transmission path as illustrated by way of an example in FIG. 16, and the sink path manager 2030 generates and transmits to the source path manager 2010 a response packet as illustrated by way of an example in FIG. 17. If the data transmission path includes a bandwidth for transmitting stream data, the source path manager 2010 generates and transmits to the sink path manager 2030 a packet requesting to secure the data transmission path as illustrated by way of an example in FIG. 18, and the sink path manager 2030 generates and transmits to the source path manager 2010 a response packet as illustrated by way of an example in FIG. 19.

If the data transmission path is completely checked and secured, the data transmitter 2020 transmits a stream to the data receiver 2040, thereby starting a streaming service.

According to an exemplary embodiment, since a stream is transmitted after a bandwidth of a data transmission path is secured, a streaming service may be executed while maintaining the QoS. Accordingly, the stability of the streaming service may be increased and user experiences may be improved in a network connected using an AV interface.

While exemplary embodiments have been particularly shown and described, it will be understood by one of ordinary skill in the art that various changes in form and details may be made therein without departing from the spirit and scope of the invention as defined by the following claims and their equivalents. The invention can also be embodied as computer readable codes on a computer readable recording medium (tangible or non-tangible). The computer readable recording medium is any data storage device that can store data which can be thereafter read by a computer system.

For example, a data transmission apparatus and a data reception apparatus according to an exemplary embodiment may include 1) a bus coupled to every element in the exemplary apparatuses illustrated in FIG. 20, 2) at least one processor connected to the bus, and 3) a memory connected to the bus to store commands, that receives and generates messages, where the processor executes the commands.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:
1. A method of transmitting data from a first device to a second device which are connected using an audio/video (AV) interface, the method comprising:
transmitting, by the first device to the second device, a third message which is a request to check whether a path is capable of transmitting a predetermined stream;
in response to the third message, receiving, by the first device from the second device a fourth message comprising information about aggregated attributes of links between the first device and the second device forming the path;
determining, by the first device, whether the path capable of transmitting the predetermined stream exists based on the received information about the aggregated attributes of the links;
in response to the determining that the path is capable of transmitting the predetermined stream, transmitting to the second device a first request message to secure the path and resources of the path for transmitting the predetermined stream to the second device;
receiving, by the first device, in response to the first message, from the second device a second response message comprising result information indicating whether the path and resources are secured; and
if the path and resources are secured, transmitting by the first device, in response to the second message, the predetermined stream to the second device,
wherein the fourth message comprises information regarding available bandwidths of the links between the devices forming the path,
wherein the information regarding the available bandwidths of the links is added to the third message by each of intermediate nodes with the links between the intermediate nodes that form the path and each of the intermediate nodes relays the third message with added information about the available bandwidth of a link from among the links corresponding to the respective node, and wherein the third message with the added information is transmitted to the second device.

2. The method of claim 1, wherein the first message comprises information regarding bandwidth required to transmit the predetermined stream.

3. A non-transitory computer readable recording medium having recorded thereon a computer program for executing the method of claim 1.

4. A method of receiving data by a second device from a first device, where the devices are connected via an audio/video (AV) interface, the method comprising:

receiving, by the second device from the first device, a third message which is a request to check whether a path is capable of transmitting a predetermined stream;

in response to the third message, the second device transmitting to the first device, a fourth message comprising information about aggregated attributes of links between the first device and the second device forming the path, for a determination, by the first device, whether the path capable of transmitting the predetermined steam exists based on the information in the fourth message;

in response to the first device determining based on the fourth message that the path exists, receiving, by the second device from the first device, a first request message to secure the path and resources of the path for transmitting the predetermined stream to the second device;

in response to the first message, transmitting by the second device to the first device, a second response message comprising result information indicating whether the path and resources are secured; and if the path and resources are secured, receiving by the second device in response to the second message, the predetermined stream, wherein the fourth message comprises information regarding available bandwidths of the links between the devices forming the path, wherein the information regarding the available bandwidths of the links is added to the third message by each of intermediate nodes with the links between the intermediate nodes that form the path and each of the intermediate nodes relays the third message with added information about the available bandwidth of a link from among the links corresponding to the respective node, and wherein the third message with the added information is transmitted to the second device.

5. The method of claim 4, wherein the first message comprises information regarding bandwidth required to transmit the predetermined stream.

6. A non-transitory computer readable recording medium having recorded thereon a computer program for executing the method of claim 4.

7. An apparatus for transmitting data from a first device to a second device which are connected using an audio/video (AV) interface, the apparatus comprising:

a path manager configured to:
transmit to the second device a third message which is a request to check whether a path is capable of transmitting a predetermined stream,
in response to the third message, transmit from the second device, a fourth message comprising information about aggregated attributes of links between the first and second devices forming the path, determine whether the path capable of transmitting the predetermined stream exists based on the received information about the aggregated attributes of the links in the third message, in response to determining that the path is capable of transmitting the predetermined stream, transmits to the second device a first request message to secure the path and resources of the path for transmitting the predetermined stream to the second device, and in response to the first message, receives, from the second device, a second response message comprising result information indicating whether the path and resources are secured; and a data transmitter which, if the path and resources are secured, transmits in response to the second message, the predetermined stream to the second device, wherein the fourth message comprises information regarding available bandwidths of the links between the devices forming the path, wherein the information regarding the available bandwidths of the links is added to the third message by each of intermediate nodes with the links between the intermediate nodes that form the path and each of the intermediate nodes relays the third message with added information about the available bandwidth of a link from among the links, corresponding to the respective node, and wherein the third message with the added information is transmitted to the second device.

8. The apparatus of claim 7, wherein the first message comprises information regarding bandwidth required to transmit the predetermined stream.

9. An apparatus for receiving data by a second device transmitted from a first device, which are connected using an audio/video (AV) interface, the apparatus comprising:

a path manager configured to:
receive from the first device a third message which is a request to check whether a path is capable of transmitting a predetermined stream, in response to the third message, transmit to the first device a fourth message comprising information about attributes of links between the first device and the second device forming the path, in response to the first device determining based on the fourth message that the path capable of transmitting the predetermined stream exists, receives, from the first device, a first request message to secure the path and resources of the path for transmitting the predetermined stream to the second device, and in response to the first message, transmit, to the first device, a second response message comprising result information indicating whether the path and resources are secured; and a data receiver, which, if the path and resources are secured, receives the predetermined stream, in response to the second message, from the first device, wherein the fourth message comprises information regarding available bandwidths of the links between the devices forming the path, wherein the information regarding the available bandwidths of the links is added to the third message by each of intermediate noes with the links between the intermediate nodes forming the path, and each of the intermediate nodes relay the third message, and wherein the third message with the added information received by the second device.

10. The apparatus of claim 9, wherein the first message comprises information regarding bandwidth required to transmit the predetermined stream.

\* \* \* \* \*